US011847167B2

(12) United States Patent
Cappetta et al.

(10) Patent No.: US 11,847,167 B2
(45) Date of Patent: Dec. 19, 2023

(54) SYSTEM AND METHOD FOR GENERATION OF CHAT BOT SYSTEM WITH INTEGRATION ELEMENTS AUGMENTING NATURAL LANGUAGE PROCESSING AND NATIVE BUSINESS RULES

(71) Applicant: Dell Products, LP, Round Rock, TX (US)

(72) Inventors: Christopher L. Cappetta, Longmont, CO (US); Andrew E. Erie, Sherman Oaks, CA (US)

(73) Assignee: BOOMI, LP, Chesterbrook, PA (US)

( * ) Notice: Subject to any disclaimer, the term of this patent is extended or adjusted under 35 U.S.C. 154(b) by 562 days.

(21) Appl. No.: 16/432,105

(22) Filed: Jun. 5, 2019

(65) Prior Publication Data

US 2020/0387550 A1 Dec. 10, 2020

(51) Int. Cl.
*G06F 16/9032* (2019.01)
*G06F 16/9538* (2019.01)
*G06F 8/34* (2018.01)
*G06F 9/54* (2006.01)
*H04L 51/02* (2022.01)

(52) U.S. Cl.
CPC .......... *G06F 16/90332* (2019.01); *G06F 8/34* (2013.01); *G06F 9/541* (2013.01); *G06F 16/9538* (2019.01); *H04L 51/02* (2013.01)

(58) Field of Classification Search
CPC .. G06F 16/90332; G06F 16/9538; G06F 8/34; G06F 9/541; H04L 5/02
See application file for complete search history.

(56) References Cited

U.S. PATENT DOCUMENTS

| | | | |
|---|---|---|---|
| 2015/0350443 A1* | 12/2015 | Kumar | H04M 3/5183 379/265.13 |
| 2018/0157739 A1* | 6/2018 | Khaitan | G06F 16/986 |
| 2019/0138600 A1* | 5/2019 | Krishnan | G10L 15/22 |
| 2020/0184540 A1* | 6/2020 | D'Souza | G06Q 30/0635 |
| 2020/0334568 A1* | 10/2020 | Liden | G06F 3/0482 |

* cited by examiner

Primary Examiner — Sherrod L Keaton
(74) Attorney, Agent, or Firm — Prol Intellectual Property Law, PLLC; H. Kenneth Prol

(57) ABSTRACT

An information handling system and method for generating a customized chat bot integration software system wherein a processor imports a chat bot template process flow into a chat bot integration process-modeling user interface which includes visual interface modeling elements corresponding to code sets, wherein the chat bot integration process-modeling user interface may include visual, drag-and-drop icons representing specific units of work for a specific chat bot integration process and modifying and customizing the visual interface modeling elements in a custom chatbot integration software system via an import wizard user-interface allowing selection of operation objects from the plurality of operation objects for each visual interface modeling element. The information handling system and method utilizes a fulfillment and response database with chat bot conversation history and association of intent and slot combinations with chat bot query responses or data locations and a natural language processing platform to determine an intent and a slot in chat bot queries to generate both simple and dynamic a chat bot query response via the customized chat bot integration software system interfacing with a plurality of data formats.

20 Claims, 11 Drawing Sheets

US 11,847,167 B2

SYSTEM AND METHOD FOR GENERATION OF CHAT BOT SYSTEM WITH INTEGRATION ELEMENTS AUGMENTING NATURAL LANGUAGE PROCESSING AND NATIVE BUSINESS RULES

FIELD OF THE DISCLOSURE

The present disclosure relates generally to a system and method for deploying and executing a customized chat bot via a data integration process platform. More specifically, the present disclosure relates to generation of a chat bot via custom connector visual elements modeling integration processes to provide low code, highly customized augmentation to natural language processing tools.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and may be utilized with chat bot systems for automated responses to natural language inquires made verbally or via text and require communication among a variety of data formats to provide responses.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
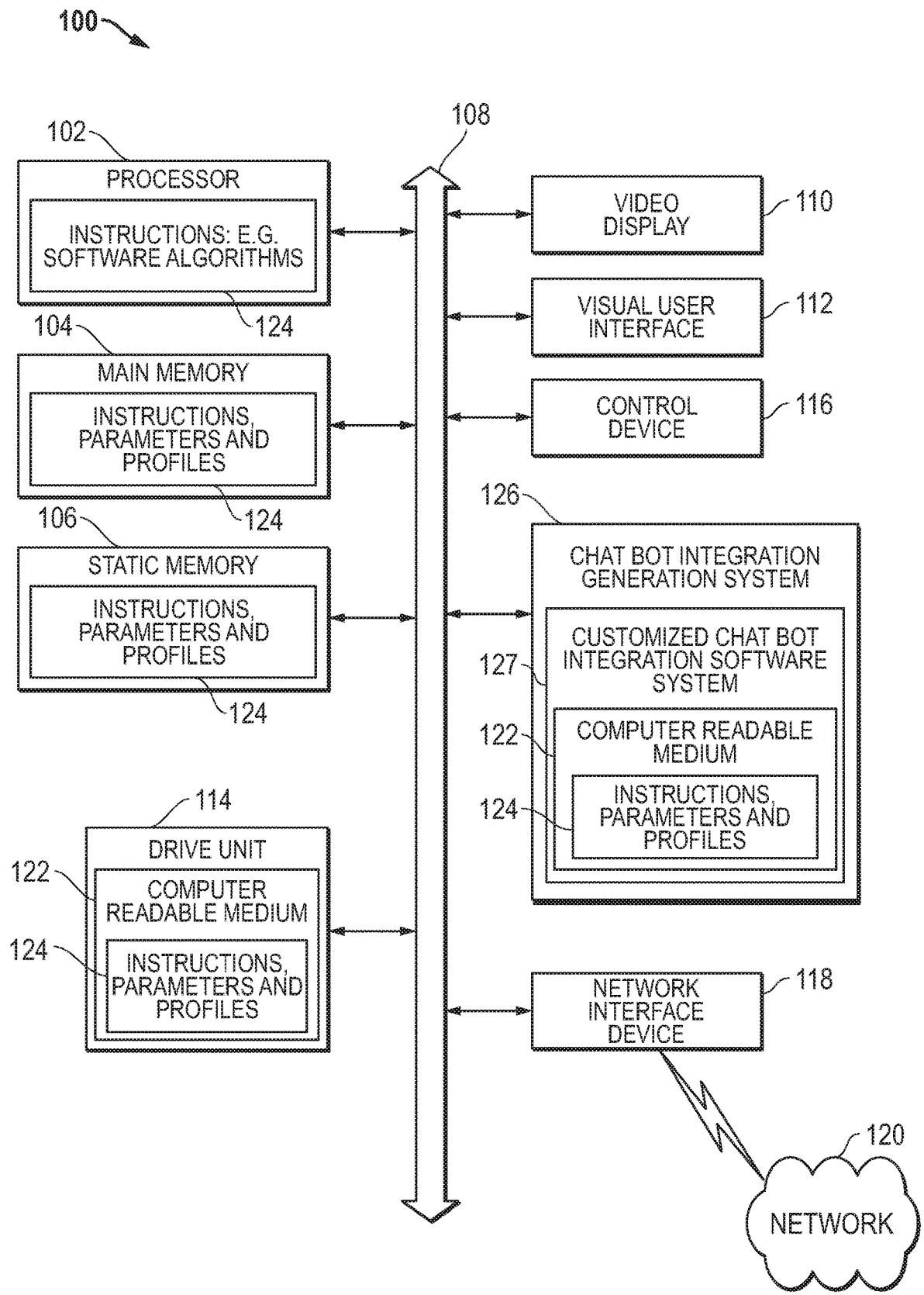
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the computer-readable medium or downloaded application, the end user executes installation files received to install the executable software application on the user's personal computer (PC), etc. When the software is initially executed on the user's PC, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments requiring customization and integration. Specifically-designed software systems may require customized programming and that customization may become additionally complicated when data formats and systems from a variety of data types are involved.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may take the form of application platform interfaces (APIs).

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example the buyer. The seller will have a similar/complementary software application on its system, so that the information exchange may be completely automated in both directions. In a similar vein, businesses such as sellers may utilize chat bot systems to enhance customer feedback capabilities however a chat bot system that is particular to the systems and issues queried for the seller may require custom code development. Again, when multiple differing computing systems, computer networks, software applications, etc. are invoked to provide data for chat bot responses, the development process can be complicated and expensive. It may be desirable or necessary to provide a low code option for chat bot development that may additionally utilize such code framework to integrate exchange information/data between distinctly different systems and business rules with a chat bot system to ensure a customized experience for customers.

In both the traditional and more recent approaches to chat bot systems, the executable software application is universal or "generic" as to all natural language processing and may provide responses from non-dynamic, accessible databases. Such underlying chat bot systems may be partially trained and use natural language processing and incorporate artificial intelligence algorithms before it is received and installed within a specific enterprise's computing network. In other words, it is delivered to different users/systems in identical, generic form. It may not comply with business rules of the implementing enterprise in some aspects. In other aspects, it is unable to respond with dynamic responses requiring custom data that may need to be drawn from multiple different computing systems, software types, data types, or the like. A generic software application or chat bot system then installed or linked to within a specific enterprise's computing network (which may include data centers, etc. physically located outside of an enterprises' physical boundaries) such as for use with a seller's website. After the generic application is installed, it must then be configured and customized for the specific seller or implementer business systems, any specific trading partners, or other partners, after which it is ready for execution to exchange data between the specific trading partner and the enterprise. For example, chat bot queries to a seller or implementer seek information available as electronic data on technical specifications, sales, pricing, foreign or domestic services, or the like that must access one or more data types formatted for electronic data communication with a chat bot framework, and how that data should be communicated with between the chat bot and a plurality of computing systems, data formats, and the like. An enterprise is then responsible for finding a generic, commercially available software product that will comply with these communication requirements for a chat bot and configuring it appropriately in a custom manner. Accordingly, the software application will not be customized for any specific enterprise until after that enterprise downloads or invokes the chat bot software application to its computing network. Then the enterprise may configure the chat bot software application for the multitude of specific enterprise computing networks, partners, data types, etc. Alternatively, the supplier may engage computer programmers to create a customized software application chat bot to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website and enterprise systems as well as outside systems using a specially configured graphical user interface to visually model a business integration process via a flowcharting process, using only a web browser interface. Such a visual modelling tool for business integrations processes provides a powerful tool for chat bot development for an enterprise. The visual modelling tool for business integration can reduce coding requirements and invoke and enhance powerful natural language processing and artificial intelligence algorithms to blend with internal enterprise business rules and access to varied data sources. During such a modeling process, the user may select from a predetermined set of process-representing visual elements that are stored on a remote server, such as the web server. A chat bot integration generation system then may be used as a chat bot development framework for preparing a custom chat bot integration software system via the aforementioned integration processes. The chat bot integration generation system may provide the integration necessary to enable a system to be customized for dynamic responses to chat bot queries to enhance natural language processing systems. Such a chat bot integration system may be used to integrate a customized chat bot integration software system into an enterprise network and with the network of partners as necessary. By way of an example, the integration process could enable a bi-directional exchange of data between internal applications of an enterprise, between internal enterprise applications and external trading partners, or between internal enterprise applications and applications running external to the enterprise for preparation of dynamic responses to chat bot queries. This may leverage both natural language processing and artificial intelligence as well as native business rules established in integrations from external and internal sources for an enterprise.

The chat bot integration generation system may provide a customized chat bot creation framework in an embodiment to allow a user to create a customized data integration software application by modeling a data integration process flow with an interface with chat bot artificial intelligence as well as with a fulfillment and responses database using a visual user interface. The chat bot integration generation system may use a chat bot integration process-modelling user interface to model the chat bot data integration process. A modeled chat bot data integration process flow in embodiments of the present disclosure may model actions taken on data elements pursuant to executable code instructions without displaying the code instructions themselves. In such a way, the visual user interface may allow a user to understand the high-level summary of what executable code instructions achieve and how that may be customized for a chat bot deployment, without having to read or understand the code instructions themselves. Similarly, by allowing a user to insert visual elements representing portions of an integration process and chat bot operations into the modeled chat bot data integration software system process flow displayed on the chat bot integration process-modelling user interface, embodiments of the present disclosure allow a user to identify what executable code instructions to achieve without having to write such executable code instructions.

Once a user has chosen what she wants an executable code instruction to achieve in embodiments for the customized chat bot integration software system described herein, the code instructions capable of achieving such a task may be generated. Code instructions for achieving each of several tasks for a deployed custom chat bot integration software system can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, machine-executable file formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the custom chat bot integration software process in some embodiments herein may be written in accordance with the same open-standard format.

In addition to the advent of open-standard, human-readable, machine-executable code instructions, the advent of application platform interfaces (APIs) designed using such open-standard code instructions have also streamlined the methods of communication between various software components. In embodiments herein, the open-standard code instructions for a specific API involved in a business integration process may be accessed and analyzed or parsed in order to understand the ways in which systems outside the API may access data controlled by the API. An API may provide specifications for the ways in which routines, data structures, object classes, variables, or remote calls may be invoked and/or handled during custom chat bot integration software processes. By clearly defining the ways in which data may be transferred or altered during a custom chat bot integration software process involving an API, the use of such an API makes the parsing of code instructions simpler.

For example, if the customized chat bot integration software system defines a specific syntax for the "get" operation, the code instructions for that customized chat bot integration software system may be easily parsed by searching for that specific syntax, and associating the portions of the code instructions where that specific syntax is found with the "get" operation. Further, the custom chat bot integration software processes may leverage natural language processing to determine intents and associate slots such that determination may be learned of what dynamic response data is required for pursuing a get operation. In such a way, the chat bot query and determination of intents and slot determination may be utilized with customized chat bot integration software system code instructions and may parsed to identify subsets of code instructions used to locate data, subsets of code used to invoke actions taken on data, and subsets of code instructions identifying specific data sets stored at the identified location, and/or the parameters of those data sets. Once a subset of code instructions and its purpose has been identified, the subset of code instructions may be stored in a memory, and associated within that memory with an identification of its purpose. For example, a specific subset of code instructions operating to invoke the "get" action in respect to customized responses pursuant to identified intents and slots associated with a chat bot query may be stored in a memory, along with an association between the intents identified, the slots determined, the stored subset of code instructions and an identification of the "get" action.

Full code instructions of a customized chat bot integration software system in embodiments described herein may include several different examples of each of these. For example, parsing the full code instructions may indicate data responsive to identified intents and slots and pursuant to keywords or keyword synonyms learned for dynamic responses may be stored at several different locations accessible by the API, several different types of actions may be performed on the data, and several different data sets with several different parameters may be stored at those many locations. Parsing the code may thus result in identification of a list of possible data repository locations accessible by the customized chat bot integration software system, which may be referred to herein as object types. Parsing the code may also result in identification of a list of possible actions that may be taken on these object types, as well as a list of possible data set identifications, referred to herein as data elements. Once each of these subsets of code instructions and their purposes have been identified, each subset of code instructions may be stored in a memory, and associated within that memory with an identification of its purpose, as described directly above as part of the integration aspect of retrieving data responsive to identified intents and slots from keywords and keyword synonyms as leveraged from available natural language processing systems accessed by the custom chat bot integration software processes.

Such lists in embodiments of the present disclosure may instruct the ways data may be accessed, and manipulated during a custom chat bot integration software processes. In other words, a custom chat bot integration software processes, or a portion thereof may be modeled simply by choosing a data object, an action, and a data element from each of these respective lists. Further, invoking the external natural language processing and artificial intelligence to generate recognition of intents identified in a chat bot query may also be modeled and determination of standard or dynamic response requirements for fulfilment of a chat bot query may be modeled and linked to a player as well as response and fulfilment tracking database and content data sources. In embodiments herein, a user interface may be generated for allowing a user to choose from a list of available data objects, a list of available actions, and a list of available data elements in order to model the behavior of a custom connector element within a visual flow diagram of a custom chat bot integration software process. A user may add a connector or other element to a visual flow diagram or customize imported visual flows into a chat bot integration process-modelling user interface to provide a chat bot creation framework. The chat bot integration process-modelling user interface is used for developing a custom chat bot integration software system including one or more integration processes. The chat bot creation framework may be provided via a chat bot integration generation system as described in embodiments herein. For example, a customized connector or other element may indicate a user wishes to access and/or manipulate data from a chat bot query, invoke a natural language processing resource, retrieve dynamic responses, set up override for follow-on responses or questions, retrieve or manipulate data via an API, or interface with a chat bot player to provide dynamic or non-dynamic responses.

Connector or other element customization may prompt display of a connector import wizard user interface. The connector import wizard user interface in embodiments described herein may then prompt the user to choose parameters for invoking a chat bot natural language processor, determinations of intents and slots, access to keyword customization options, determination parameters of fulfilment for chat bot queries, determinations for appearance and operation of a chat bot player, or choose an object type from the list of available object types identified through the parsing of that API's code instructions for determination of data retrieval to fulfill dynamic or non-dynamic responses to chat bot queries. Similarly, the connector import wizard user interface may prompt the user to select an available action, and an available data element for many of these steps. In doing so, the user may define a custom chat bot integration software processes involving accessing the chosen natural language processing platform, parsing the chat bot queries, accessing one or more chosen data objects (e.g. data location), and performing the chosen action on the chosen data element stored at the chosen data location. In order to execute such a custom chat bot integration software processes, the subsets of code instructions associated with each of the above may be automatically located within memory, and combined to form a custom connector code set for execution by a run-time engine. In such a way, the user may design the custom chat bot integration software processes involving an invoked natural language processing resource and accessing data via the API by choosing from a list of available data objects, actions, and data elements within the connector import wizard user interface, without having to write, read, or access any code instructions.

A connector wizard user interface in embodiments described herein may be generated following the parsing of the API code instructions. The API may adhere to one of the open-standard, human-readable, machine-executable file formats (e.g. WL, JSON), to establish object types, actions, and/or data elements that may be incorporated into an API's code instructions for an integration. When a user chooses an object type, action, and/or data element within the connector import wizard, a visual connector element representing the user-specified communication with the API may be inserted into a larger visual integration process flow diagram. Other visual components, such as invoking a natural language processing platform, connection to an SQL database for responses as well as fulfillment tracking, and other visual components may then be added to the visual connector component in order to model a full integration process for the custom chat bot integration software processes. In some embodiments, the visual connector component by itself may form the full custom chat bot integration software process. The integration process modeled by the combination of all user-chosen visual process components may then be used to generate the custom chat bot integration software system for deployment. A custom chat bot integration software processes in an embodiment may include a run-time engine for execution of a connector code set comprising data required for electronic communication. The dynamic runtime engine, when initiated, in an embodiment, may download the connector code set associated with it, and execute that code instruction to perform the custom chat bot integration software process modeled by the custom connector integration element in the visual flowchart generated by the user. Examples are set forth below with respect to particular aspects of an information handling system for generating custom connector visual elements for a custom chat bot integration software process and a low-code platform for creation of the same.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for a variety of firmware or software applications and systems including for the chat bot integration generation system 126 or customized chat bot integration software system 127 that may operate on servers or systems, remote data centers, or on-box in individual client information handling systems such as a local display device, or a remote display device, according to various embodiments herein. In some embodiments, it is understood any or all portions of code 124 for the chat bot integration generation system 126 or customized chat bot integration software system 127 may operate on a plurality of information handling systems 100. Chat bot integration generation system 126 may provide a chat bot creation framework for developing a customized chat bot integration software system 127. For example, the custom chat bot integration software system may include one or more integration processes leveraging natural language processing resources as well as native business rules relating to systems and integrations for a user or entity seeking to deploy a customized chat bot. In other aspects of the present disclosure, some embodiments may utilize parts or all of code 124 as a deployed custom chat bot integration software system.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the chat bot integration generation system 126 or a custom chat bot integration software system application 127 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the chat bot integration generation system 126 or a custom chat bot integration software system application 127 developed from the same. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment. The visual user interface 112 may include a chat bot integration process-modelling user interface permitting a user to define process flows between applications/systems, such as between various databases such as trading partner and enterprise systems, and to model a customized chat bot integration software system 127. The visual user interface 112 may comprise part of that chat bot integration generation systems 126 for the customizable chat bot creation framework to allow a user to create the custom chat bot integration software system application 127. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. User-selectable visual elements such as icons displayed via the visual interface 112 may be further customized with one or more connector import wizards according to embodiments herein. Information and computer executable instructions for presenting such a graphical user interface 112 are stored in a memory of the custom chat bot integration software system application 127 upon release of the custom chat bot.

Further, the graphical user interface 112 allows the user to provide user input providing information relating to chat bot response, fulfillment parameters, databases of responsive information pertaining to trading partners, activities, enterprise applications, enterprise system attributes, and/or process attributes that are unique to a specific enterprise business integration process for developing custom chat bot integration software system application. For example, the graphical user interface 112 may provide drop down or other user-selectable menu options for identifying responses, query intents and slots, overrides for follow-on questions or responses, information databases or types within the enterprise, trading partners, application connectors, and process attributes/parameters/settings, or the like via connector wizards. Further, a graphical user interface 112 may be used with chat box dialog boxes permitting textual entries by the user or for setting up other players for interfacing between a chat bot and a chat bot user including such as to describe the format and layout of particular queries, responses, and data set to be sent or received, for example, a chat bot interface. The providing of this input by the user results in the system's receipt of such user-provided information as an integration process data profile code set when creating a custom chat bot integration software system with a chat bot integration generation system 126 or when implementing a custom chat bot integration software system application 127 for a conversant exchange with a chat bot user during a chat bot session.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as Swagger APIs, WinAPIs (e.g. Win32, Win32s, Win64, and WinCE), or an API adhering to other proprietary or open source specifications may enable application programs 124 to interact or integrate operations with one another.

In an example of the present disclosure, instructions 124 may execute software for generating a visual connector element for an integration process involving data transfer or manipulation between an enterprise system/network and an API enabling interaction between the application program and device drivers such as a display screen or microphone and speaker system as well as other aspects of the information handling system and software instructions 124 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the chat bot integration generation system 126 or a custom chat bot integration software system application 127 may include a computer-readable medium 122 such as a magnetic disk, or a solid-state disk in an example embodiment. The computer-readable medium of the memory, storage devices 104, 106, 114, 122 and the chat bot integration generation system 126 may store one or more sets of instructions 124, such as software code corresponding to the present disclosure.

The disk drive unit 114, static memory 106, and computer readable medium 122 of the Swagger connector integration element generation system 126 also contain space for data storage such as an information handling system for managing locations of executions of customized integration processes in endpoint storage locations such as for a custom chat bot integration software system. Connector code sets, natural language processing integration code sets, and particularized database code sets such as trading partner code sets may also be stored in part in the disk drive unit 114, static memory 106, or computer readable medium 122 of the chat bot integration generation system 126 or a custom chat bot integration software system application 127 in an embodiment. In other embodiments, data profile code sets, and run-time engines may also be stored in part or in full in the disk drive unit 114, static memory 106, or computer readable medium 122 of the chat bot integration generation system 126 or a custom chat bot integration software system application 127. Further, the instructions 124 of the chat bot integration generation system 126 or a custom chat bot integration software system application 127 may embody one or more of the methods or logic as described herein.

In a particular embodiment, the instructions, parameters, and profiles 124, and the chat bot integration generation system 126 or a custom chat bot integration software system application 127 may reside completely, or at least partially, within the main memory 104, the static memory 106, disk drive 114, and/or within the processor 102 during execution by the information handling system 100. Software applications may be stored in static memory 106, disk drive 114, and the chat bot integration generation system 126 or a custom chat bot integration software system application 127.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The chat bot integration generation system 126 or a custom chat bot integration software system application 127 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. Further, the chat bot integration generation system 126 or a custom chat bot integration software system application 127 may be part of information handling system 100 and connected via bus 108.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the chat bot integration generation system 126 or the customized chat bot integration software system 127 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
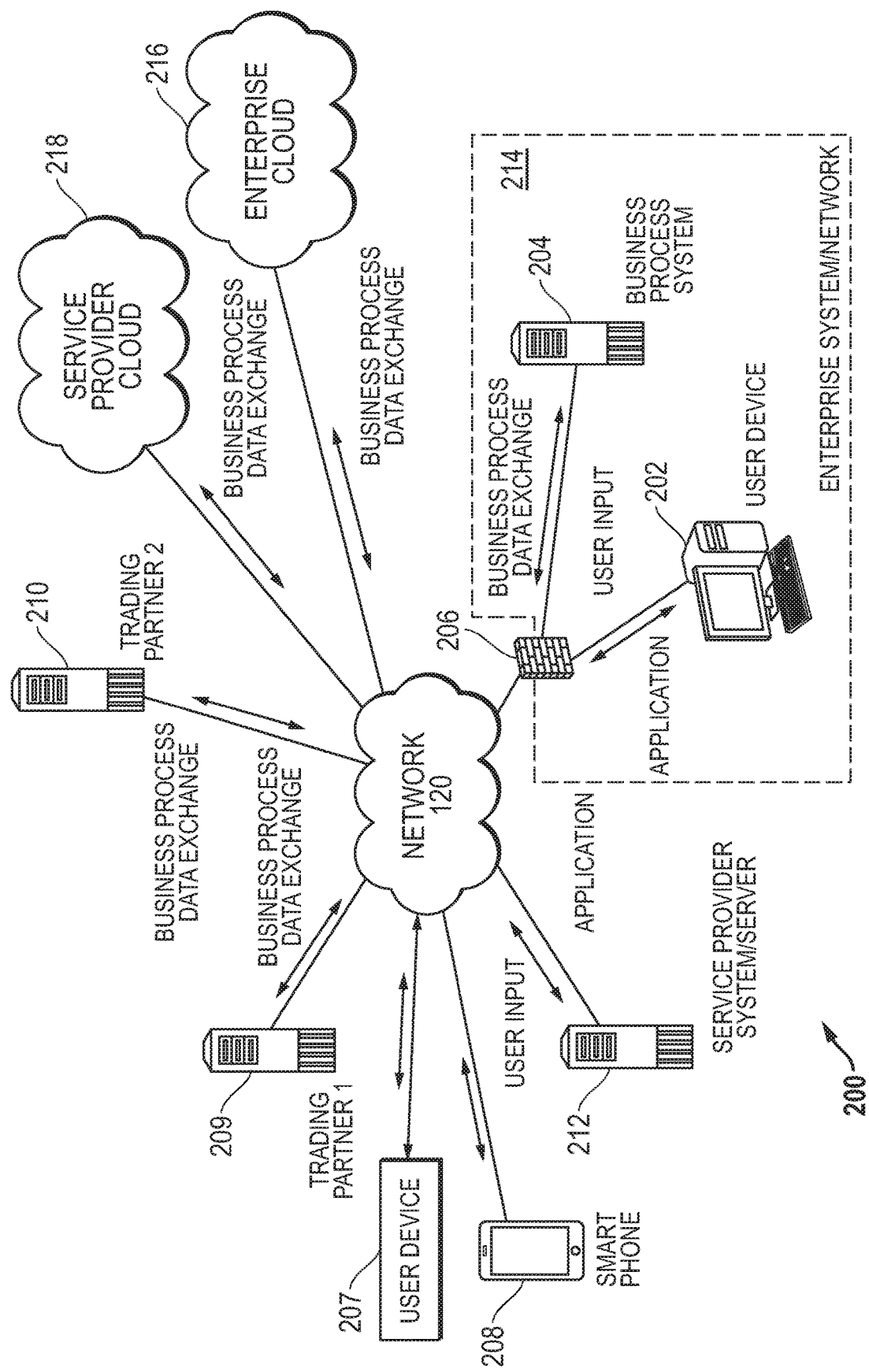
FIG. 2 is a block diagram illustrating a simplified integration network according to an embodiment of the present disclosure.

FIG. 2 is a block diagram illustrating a simplified integration network 200 including a service provider system/server 212 and an enterprise system/network 214 for use with a chat bot integration generation system or for use with the customized chat bot integration software system developed therefrom in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. Similarly, customers or others interfacing with a customized chat bot integration software system implemented for a deployed custom chat bot system may any user device 207 such as a smart phone system 208. User device 207 used by a customer or other person interfacing with a deployed customized chat bot integration software system according to embodiments herein may be devices similar to those described for user device 202. Devices 207 and smart phone system 208 may also communicate via network 120 or similar network to connect with a customized chat bot integration software system operating within an enterprise system or network 214. The user devices 202, 207, or 208 in an embodiment may be configured with conventional web browser software, such as Google Chrome®, Firefox®, or Microsoft Corporation's Internet Explorer® for interacting with websites via the network 120. In an embodiment, the user device(s) 202 may be positioned within an enterprise network 214 behind the enterprise network's firewall 206, which may be of a conventional type. In another embodiment, the user device(s) 207 or smart phone 208 may be positioned either within or outside an enterprise network 214 and in some embodiments outside the enterprise network's firewall 206 but access the customized chat bot integration software system via a customized chat bot deployed via an enterprise website. As a further aspect of an embodiment, the enterprise network 214 may include a business process system 204, which may include conventional computer hardware and commercially available business process software such as QuickBooks®, Oracle's OneWorld®, JD Edward ERP, Infor's WMS Application®, or many other types of databases. In particular, business process systems 204 in enterprise network 214 may also include SQL databases for tracking and storing updated, learned responses to queries received via chat bot as well as fulfillment determinations for chat bot queries.

Service provider system/server 212 in an example embodiment may include one or more types of natural language processing systems and artificial intelligence platforms utilized with chat bot systems to natural language recognition and interpretation. However as described above, stock natural language processing systems are limited and may recognize intents and provide some simple responses drawn from database accesses, limitations exist in providing customized chat bot systems which utilize the natural language processing. The customized chat bot integration software according to embodiments herein may be customized for the databases and sources of information and query responses needed that are particularized for an enterprise system network 214 as well as interfacing with outside, relevant information sources used for business processes of an enterprise such as data exchange information with outside data sources such as trading partner systems 1 and 2 209 and 210, service provider cloud systems 218, or other enterprise cloud data resources 216.

In an embodiment, the integration network 200 may include trading partners 209 and 210 operating conventional hardware and software for receiving and/or transmitting data relating to business-to-business transactions. For example, Walmart® may operate trading partner system 209 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via FTP or SFTP.

As yet another example embodiment, trading partner system 209 may allow for access and manipulation of data according to an application interface platform (API) adhering to the Swagger open source specification or other API platforms. For example, the Swagger standard or other API standards define a specific syntax for identifying data locations, a list of available actions that can be taken on data, and a syntax for identifying specific data sets or data elements. This preset definition of syntaxes allows for easy identification of subsets of code instructions with specific data locations, actions, and data elements. As such, code instructions written in accordance with the Swagger specification or other specifications become much easier to parse.

In an embodiment, a provider of a service ("service provider") for creating on-demand, real-time creation of customized chat bot integration software applications may operate at a remote location in some embodiments such as at a service provider server/system 212 within the integration network 200. In other embodiments, the service provider 212 may provide natural language processing and artificial intelligence capabilities as a language recognition platform that a customized chat bot integration software application may enhance via integration with a specified enterprise system or network and related accessible data sources. One or more types of service provider systems 212 may operate according to some embodiments herein for distinct purposes to enable creation or operation of a deployed, customized chat bot integration software system for use within integration network 200. The service provider system/server 212 may be specially configured in an embodiment, and may be capable of communicating with devices in the enterprise network 214. The service provider system/server 212 in an embodiment external to enterprise network 214 or user system 202 within enterprise network 214 may host an integration process-modeling user interface in various embodiments. Such an integration process-modeling user interface may operate as a chat bot integration generation system to allow a user to model an integration process including one or more sub-processes for query processing via a natural language processing service provider such a 212 as well as data integration through a business process data exchange between an enterprise system/network 214 and outside entities. The chat bot integration software system process modeled in the integration process-modeling user interface in an embodiment may be a single business process data exchange shown in FIG. 2, or may include several business process data exchanges shown in FIG. 2 for purposes of providing particularized capability of a customized chat bot integration software system to provide responses to user queries from user devices 207 or smart phones 208. For example, a chat bot query may require responses particularized with data retrieved by the enterprise system/network 214 that may involve in a business process data exchange via network 120 with a trading partner 1, and/or a trading partner 2. In other example embodiments, the chat bot query may require enterprise system/network 214 be involved in a business process data exchange via network 120 with a service provider located in the cloud 218, and/or an enterprise cloud location 216 to fulfill a query received via the chat bot integration software and language intent parsed via a natural language processing service provider called upon.

The user of a chat bot integration generation system according to embodiments herein may reduce the coding and cost of customized coding to develop a customized chat bot integration software system via the chat bot integration process-modeling user interface. The chat bot integration process-modeling user interface in an embodiment may be used to call natural language processing along with establishing calls to one or more business process data exchanges internal to enterprise network 214 or via network 120 by adding one or more connector integration elements to a chat bot integration process flow diagram. These connector integration elements in an embodiment may model the ways in which a user wishes data to be accessed, moved, and/or manipulated during the one or more business process data exchanges for fulfillment of chat bot query processing. Customization of the connector integration elements is similarly available with the chat bot integration process-modeling user interface. Moreover, the chat bot integration process-modeling user interface may import one or more flows of connector elements that may serve as a customized chat bot creation framework.

Each connector element the user adds to the integration process flow diagram in an embodiment may be associated with a pre-defined subset of code instructions stored at the service provider systems/server 212 or available within enterprise network 214 depending on where relative portions of the chat bot integration generation system is operating in embodiments herein. The chat bot integration process-modeling user interface may be used to import flow packages such as administrative portal flow packages which may be used for customization or appearance of player systems for chat bot appearance and function details or chat bot flow packages for management of conversation embeddable details within a website deployment as well as interfacing details with natural language processing or database interfacing. Upon the user modeling the integration process, the service provide system/server 212 or the internal user device 202 in embodiments may generate a run-time engine capable of executing the pre-defined subsets of code instructions represented by the chat bot connector integration elements chosen by the user to create a customized chat bot integration software system. In an embodiment, a service provider system 212 may host and administer some or all of a business integration platform used as a chat bot integration generation system. Similarly, the service provider system 212 may host or administer some or all of the resulting customized chat bot integration software system. The business integration platform may be a Dell Boomi® platform for example. The runtime engine may then execute the subsets of code instructions in the order defined by the modeled flow of the connector integration elements given in the integration process flow diagram as the customized chat bot integration software system according to embodiments herein. In such a way, a reduced-code customized chat bot integration software system process may be executed without the user having to conduct time-consuming access, read, or write the code instructions of such an integration process. This may provide a cost-effective, powerful leveraging of existing natural language processing systems for customized integration into an enterprise systems for an improved, deployed chat bot experience for customers or other accessing an enterprise chat bot system.

Figure 3:
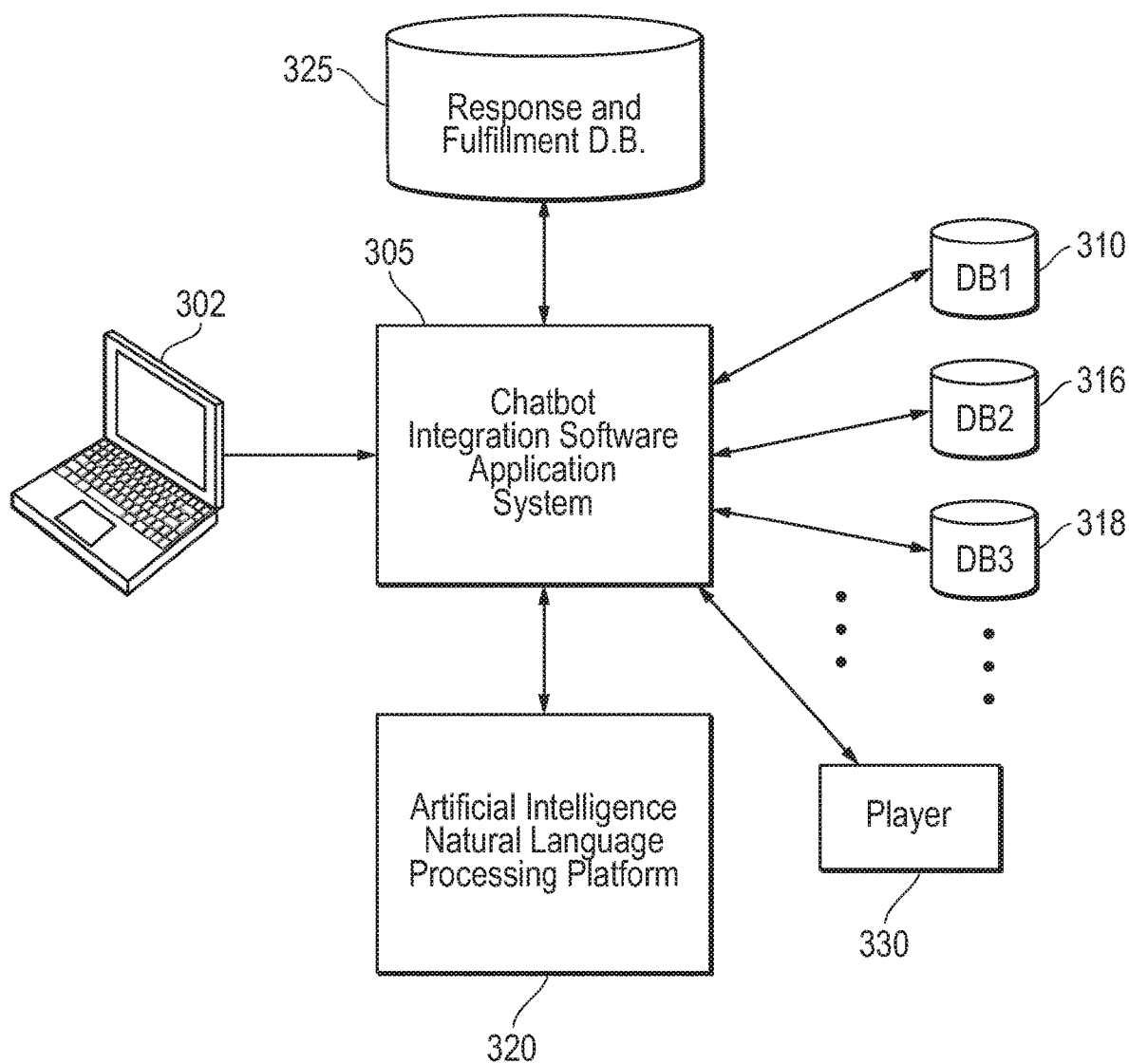
FIG. 3 is a block diagram illustrating a simplified customized chat bot integration software application platform according to an embodiment of the present disclosure.

FIG. 3 is a simplified block diagram illustrating a customized chat bot integration software application system 305 according to an embodiment of the present disclosure. Customized chat bot integration software application system 305 may have been generated via the customized chat bot integration generation system described in various embodiments herein. For example, the customized chat bot integration generation system may provide for the subsets of code instructions generated pursuant to a chat bot creation framework provided via an integration process-modeling user interface described in several embodiments herein. Such a customized chat bot integration generation system may establish the integration among elements of a customized chat bot system deployed. The customized chat bot integration generation system provides for customizable and fluid interfacing among several elements of the deployed, customized chat bot integration software system 305 as depicted in the example embodiment of FIG. 3.

For example, customized chat bot integration software system 305 may be operatively coupled to call on an artificial intelligence and natural language processing platform 320 in an embodiment. Several example artificial intelligence and natural language processing platforms maybe used in various embodiments, and the parsing of natural language queries received from a user device information handling system such as 302 may be leveraged with the customized chat bot integration software system 305. Example artificial intelligence and natural language processing platforms service providers that may be used include Amazon® Lex natural language processing, Google® DialogueFlow natural language processing, Salesforce® Einstein natural language processing, or other speech recognition systems leveraging artificial intelligence platforms to enhance either spoken or written language recognition systems.

In addition to accessing a natural language processing platform 320, the customized chat bot integration software application system 305 may provide business integration capabilities to enhance responding to chat bot queries received from a customer or other user of the customized chat bot at 302. The customized chat bot integration software application system 305 provides business integration connectivity to a variety of databases or data sources such as data bases 310, 316, 318, or others located locally, remotely or both to prepare customized, intelligent responses. Chat bot queries may be parsed such that the query may be categorized as one or more "intents" as well as a variety of "slots" that may require custom information access particular to an enterprise implementing a customized chat bot. For example, some non-dynamic queries may include a recognizable intent and a slot with a common or easily recognizable categorization for which response is simple. In such cases, a natural language processing generated response might be used without additional dynamic response capability. Example intents may include intents such as "what is", "when is", "where is", "I'd like to", "I'm looking for", "I want to", "Please find", and a variety of other example intents. Intents may have one or more slots incorporated within which may invoke simple responses manageable by a natural language processing system or direct access to prepared database information in some embodiments. In other aspects, intent and slot combinations may invoke dynamic slot categorization and recognition, including synonym recognition to prepare "get" or similar calls to retrieve information from any of several data sources via the business integration connectivity provided in a customized chat bot integration software system 305 according to embodiments herein.

An intent and slot training process may be handled with respect to further addressing fulfillment successes and failures by the customized chat bot. Such tracking of fulfillment and success or modification of responses, synonym recognition and other aspects may utilize a response and fulfillment data base 325 operatively coupled to the customized chat bot integration software application system 305. An administrative dashboard or user interface may be utilized by an administrator to modify or customize missed chat bot queries, in other words unfulfilled queries, with responses desired by an enterprise. As the artificial intelligence is trained at appropriate responses or slot fulfillment response data, less training interaction may be required. Moreover, training and responses may be reusable across multiple channels of inquiry for one or more customized chat bots utilized and deployed by an enterprise.

Additionally, a player 330 may be utilized for presentation of the chat bot for accepting queries and providing responses, such as via a web-based, short message service (SMS), multiple message service (MMS), voice access software, or other deployment of a customized chat bot integration software system according to embodiments herein. An administrative dashboard or user interface may be utilized by an administrator to customize responses, such as courtesies utilized, appearance or sound of a chat bot, or other customization aspects of the interface elements of the customized chat bot integration system accessed by a customer or other user on behalf of an enterprise.

Figure 4:
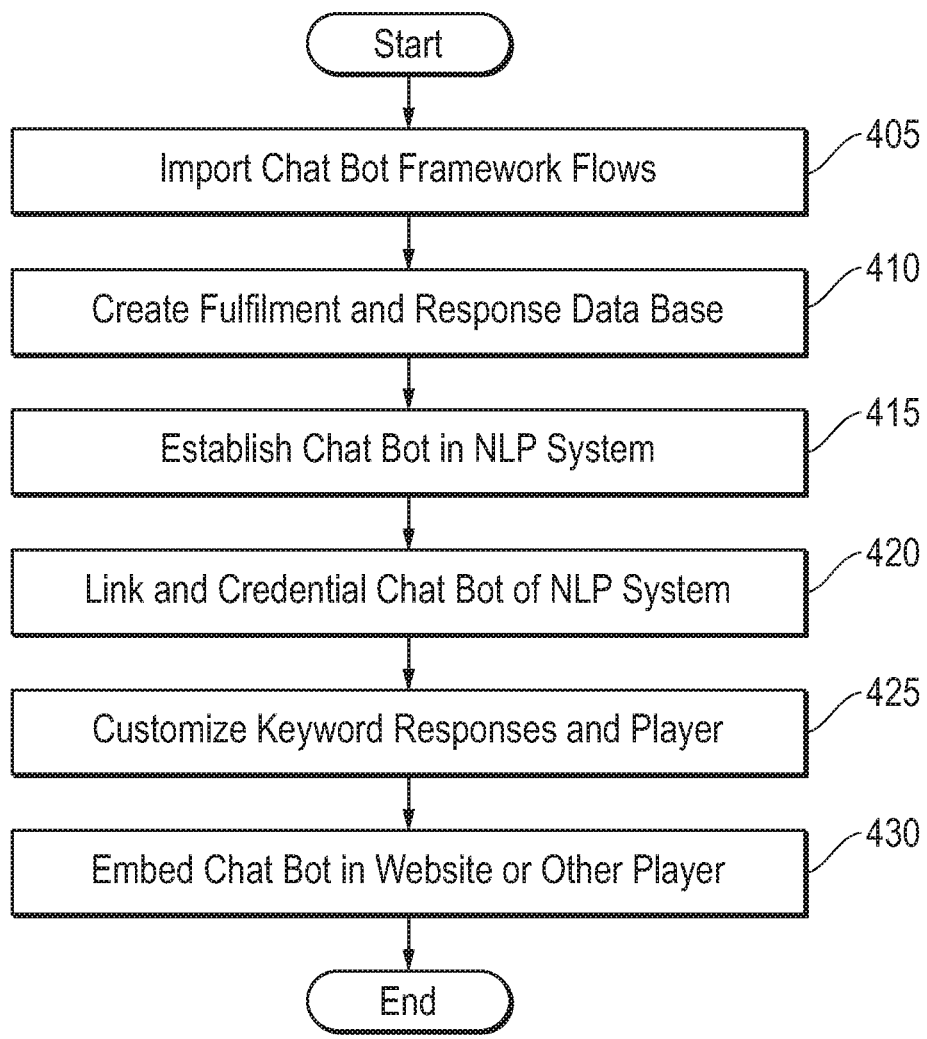
FIG. 4 is a flow diagram illustrating a method of generating a custom connector code set for a custom chat bot integration software system according to an embodiment of the present disclosure.

FIG. 4 is a flow diagram illustrating a custom chat bot integration generation system utilizing a custom chat bot creation framework. A chat bot integration process-modeling user interface with connector code sets according to embodiments of the present disclosure. In an example embodiment, the chat bot integration process-modeling user interface may be used with a plurality of imported flows and connectors and other nodes to create a visually modeled business integration for a custom chat bot integration software system.

Flow may begin at 405 where a user may import chat bot framework flows into a chat bot integration process-modeling user interface, for example, Dell Boomi® Atomsphere. Within the chat bot integration process-modeling user interface, a flow for a conversation interface that may be implementable within a website or deployable via another format as described may imported. Additionally, administrative portal flow may also be imported into the chat bot integration process-modeling user interface environment. The administrative portal flow may include parameters for customizing settings for establishing a database, such as an SQL database, for logging a history of bot conversations, settings for keyword-specific responses including synonym recognitions, and logging fulfillment data. Portions of flows may be connected via connectors to outside data sources, to other flows or actions, to a player for running a customized chat bot interface, or to a natural language processing platform and other service provided resources. The administrative flow may also provide for a player system to allow for front-end styling or choices of interface style, phrases, sound, or appearance of the customized chat bot interface player generated pursuant to the chat bot integration process-modeling user interface. Each of the flows, for example, may be overlays on JSON coding logic for elements within the flows and customized connector and element modifications made for implementation of the imported flows.

The flow or flows imported may be a series of visual interface modeling elements corresponding to code sets within the chat bot integration process-modeling user interface. These visual interface modeling elements may be icons as depicted in various embodiments herein. These may include visual, drag-and-drop icons representing specific units of work for each part or step in the progression of a specific chat bot integration process that is custom modified to link with an enterprise's multitude of data base formats or external data sharing partner systems and formats. The specific chat bot integration process also enables integration with the natural language processing platform and artificial intelligence systems being leveraged from one or more service providers. Also, the specific chat bot integration process coordinates any internal artificial intelligence and identified intent and slot further processing necessary to provide a simple or dynamic response to a chat bot query. As such, the specific chat bot integration being established for the customized chat bot integration software system relies upon establishing a fulfillment and response database for tracking chat bot conversations conducted and currently ongoing including chat bot query status logs, fulfillment success or misses, and association of intents and slots or combinations of the same with chat bot responses or data locations for fulfillment.

The visual interface modeling elements may be selected and added to imported flow and those or existing visual interface modeling element may be modified and customized to work within the specific chat bot integration of the chat bot integration software system. This permits the chat bot integration software system to be generated from code sets, parameters, objects, API utilization, and links associated and customized in the various visual interface modeling elements to be customized for an enterprise seeking to deploy a robust chat bot without extensive, custom programming. Modifying and customizing the visual interface modeling elements may be conducted via import wizard user-interfaces that include drop down menus and customized data entry fields for customization of the visual interface modeling elements to operate in accordance with the native interface rules of data sources, desired responses, chat bot interface player appearance, and other aspects desired by the deploying enterprise.

At 410, the custom chat bot integration system creation may proceed with creating an SQL or other type of database for tracking and logging chat bot performance and for training and teaching with respect to responses to chat bot queries. In an example embodiment, the database may be referred to as a fulfillment and response database. The database may record chat answers made or missed by the chat bot, record training efforts and modification to missed chat bot answers, and learned responses to chat bot queries during operation of the customized chat bot. In the process of setting up the fulfillment and response data base, credentials and formatting parameters may be customized for meeting a template of data with respect to data fields, information headers and source identifications, and any security credentials for interfacing with the customized chat bot integration software system being created with the chat bot integration process-modeling user interface. For example, a customizing connector or element wizard interface may be used. The fulfillment and response database will also need to be configured for various responses types, keywords, synonyms, and particularized responses where relevant. In an embodiment, an SQL database may be set up with a remote cloud database service provider such as via Amazon Web Services® or other cloud computing resources made available from service providers. In such embodiments, the externally sourced fulfillment and response database may require conforming to the enterprise system, the chat bot integration process-modeling user interface software systems and chat bot and administrative portal templates, as well as other pieces of the customized chat bot integration software system.

Proceeding to 415, the administrator using the chat bot integration process-modeling user interface may establish a new chat bot in the natural language processing (NLP) system selected for creation of the customized chat bot integration software system. Several example natural language processing systems may be utilized and called from the imported chat bot template process flows. Within the selected natural language processing system service provider software, to which the customized chat bot integration software system will interface, the chat bot is created, intents are added, slot types are associated with intents, special keywords and keyword synonyms are determined, and a bot alias is assigned in example embodiments. Then the chat bot created at the service provider for the natural language processing platform may be built and published.

At 420, the new chat bot in the natural language processing platform is created such that it conforms to an enterprise's requirements for a chat bot as well as credentialed and formatted for communication with the customized chat bot integration software system as established via the chat bot integration process-modeling user interface. The configurations are made to link to the flow templates of the chat bot integration process-modeling user interface for developing the customized chat bot integration software system. For example, configuration values may include creation of encryption keys as necessary including secret and user access keys, users or groups, and roles. Establishing multiple policies including the identity policies, resource policies, permissions based on user identities, roles or the like, access and session policies are examples of configurations policies that may be utilized when granting permissions and linking the new chat bot established via a service provider natural language processing platform and its integration with customized chat bot integration software system being created.

At 425, an administrator developing a customized chat bot integration software system via the chat bot integration process-modeling user interface may begin customization with the fulfillment and response database. In particular, customization of keyword responses and player operation may be conducted via an administrative portal whereby particular database security permissions are determined. Further, connection to the database with the database client and creation of database tables as well as database service configurations values within the chat bot flow templates are created. Example settings may include passwords, server public certificate settings, database type identifier, database schema identifier, database name identifier, port identifications, host identifications, usernames, and the like. For setting up the fulfillment and response database five example tables may be established including: chat_answers_made, chat_fulfills, chat_missed, chat_replies, and chat_track tables. A table such as chat_answers_made and chat_track maintain a record of conversations logged with a deployed customized chat bot pursuant to embodiments herein. Chat_fulfills monitor fulfillment status and record for customized chat bot conversations. Chat_answers_made and chat_missed track success or miss rates of chat bot replies or attempted replies to chat bot queries conducted during customized chat bot conversations. Chat_replies are a database of potential replies customized in response to identified intents and slots or data to be searched to fill values from other data sources. Other data sources may include response data available in the fulfillment and response database or via integration to access other databases within or external to the enterprise which may be of a variety of formats and from a variety of systems. The fulfillment and response database may provide accessible potential keywords for specific responses or slots from one particular intent formation received. The slots for the specific responses may be coded and the slots associated with intents trained to find codes over use of the customized chat bot integration software system. For example, machine learning classifier systems may be used to learn over time which intent and slot code combinations as well as relevant keywords or synonyms are associated to develop or retrieve the data to form a successful response to customized chat bot queries.

According to the above system in an embodiment, the customized chat bot integration software system may add dynamic responses for keyword specific responses. Then the development may update the flow templates of the chat bot integration process-modeling user interface for the customized chat bot integration software system with the above updated configurations for interfacing with the fulfillment and response database.

Proceeding to 430, the customized chat bot integration software system may be run and tested such that the customized flow templates of the customized chat bot integration software system are directed between the service provider natural language processing platform, the fulfillment and response database, integration flow connectivity to multiple format databases, and to the chat bot player for an interface with a customer or other user of the chat bot system deployed by an enterprise. The player may be created and customized for appearance, greeting messages, other courtesy messages, sounds, or the like. Then the customized chat bot integration software system may be embedded in the deployment service. The deployment service, for example may be a website, a telephone response system, an MMS/SMS response service, or other similar customized chat bot access pathways.

Figure 5A:
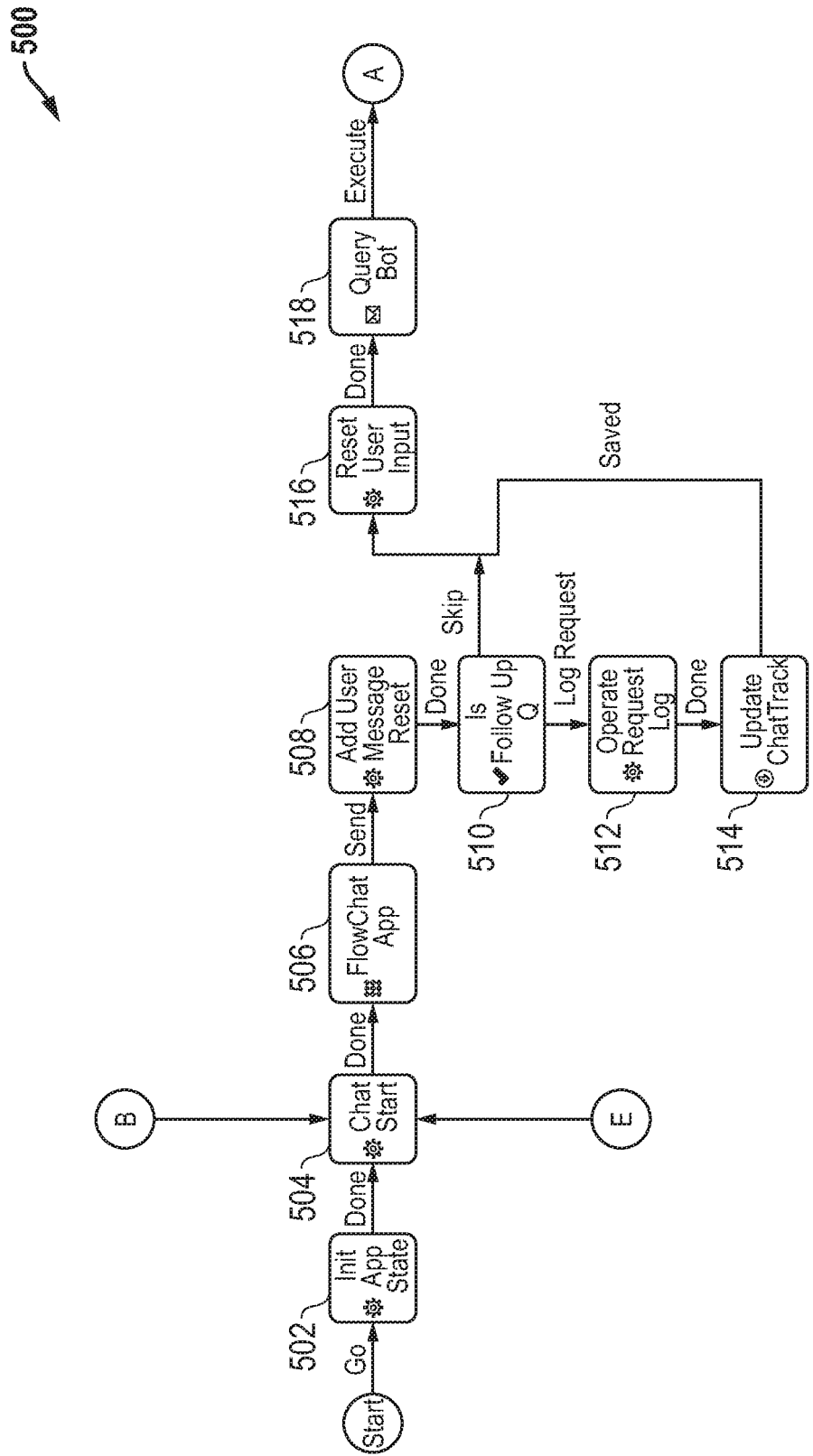
FIG. 5A is a block diagram illustrating a user-generated flow diagram of a custom chat bot integration software system via a chat bot integration generation system according to an embodiment of the present disclosure.
Figure 5B:
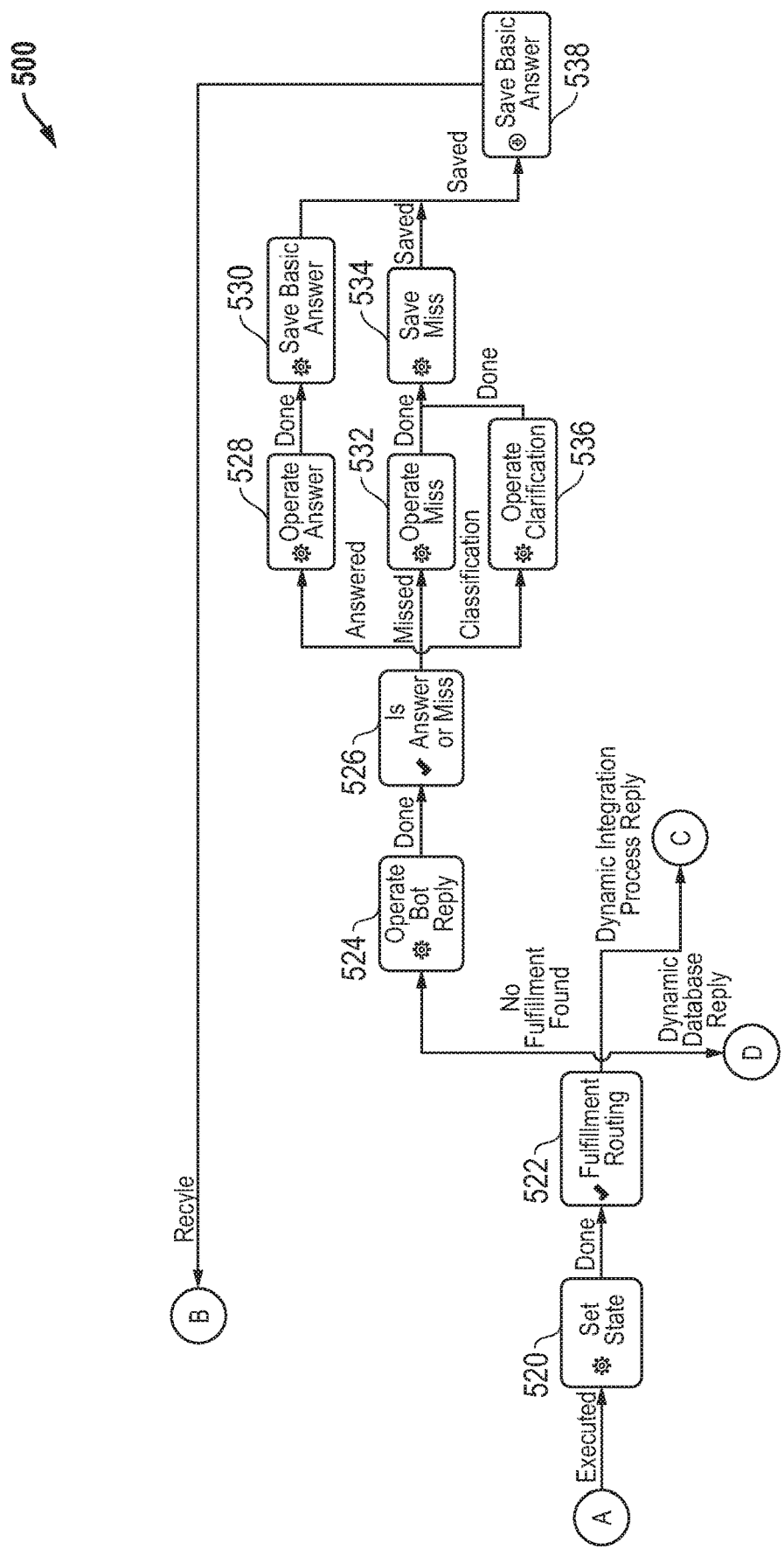
FIG. 5B is a block diagram illustrating a user-generated flow diagram of a custom chat bot integration software system via a chat bot integration generation system according to an embodiment of the present disclosure.
Figure 5C:
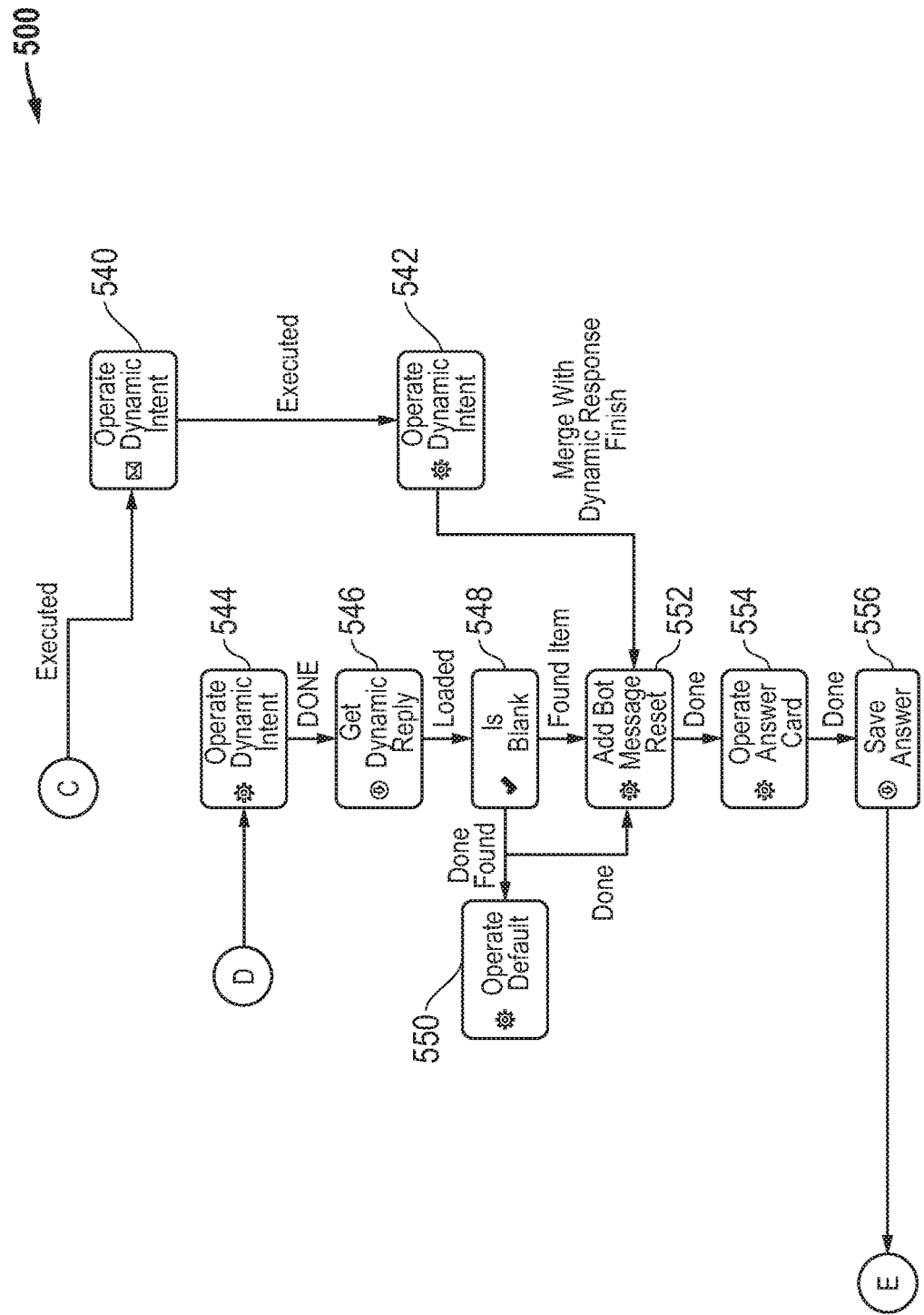
FIG. 5C is a block diagram illustrating a user-generated flow diagram of a custom chat bot integration software system via a chat bot integration generation system according to an embodiment of the present disclosure.

FIGS. 5A, 5B, and 5C are a block diagram illustrating a user-generated flow diagram of a chat bot integration process for interfacing with a natural language processing platform, a player, a fulfillment and response database and exchange of electronic data records to provide an enhanced, intelligent and customized chat bot system for an enterprise according to an embodiment of the present disclosure. A user may generate a flow diagram in an embodiment by providing a chronology of process-representing integration elements via the use of a chat bot integration process-modeling user interface. In some embodiments, the integration process-modeling user interface may take the form of a visual user interface for importing or establishing flow templates for developing the customized chat bot integration software system. In such embodiments, the user-selectable elements representing integration sub-processes (e.g. connector integration elements) may be visual icons. Examples of the integration process-modeling user interface for utilizing flow templates to develop the customized chat bot integration software system may include Dell Boomi Atomsphere®, or Boomi Flow® and Boomi Integrate® tools in example embodiments.

A chat bot integration process-modeling user interface in an embodiment may provide a design environment permitting a user to import defined process flows such as a bot flow template or an administrative portal flow template and to customize and link those process flows between multiple applications/systems. For example, the process flows may link chat bot operation capability for a service provider for natural language processing platforms, a player, a fulfillment and response database systems for learning and determining customized responses as well as a plurality of data sources having differing formats and systems for customized response generation with accessibility for intent and slot fulfillment tasks. Multiple data sources may be linked to the customized chat bot integration software system. These may include on-site data centers and cloud-based storage modules, other enterprise systems, or trading partner systems to model a customized chat bot integration process. Such a chat bot integration process-modeling user interface in an embodiment may provide a menu of pre-defined user-selectable elements representing integration sub-processes and permit the user to arrange them as appropriate to model a full integration process for a customized chat bot integration software system. For example, in an embodiment in which the chat bot integration process-modeling user interface is a visual user interface, the elements may include visual, drag-and-drop icons representing specific units of work (known as process components) required as part of the customized chat bot integration process. This may include imported process flows as templates for the customized chat bot integration process development including several connected elements in a flow for linking with natural language processing and for establishing a player and a fulfillment and responses database. Such a process component in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, and the like for the purposes of generating customized chat bot query responses.

Each process component as represented by integration sub-process icons or elements that may be identifiable by a process component type, and may further include an action to be taken. For example, a process component may be identified as a "connector" component. Each "connector" component or other element may be chosen as an icon and added to the process flow in the integration process-modeling user interface. Choosing different connector or other element icons may allow a user to choose from different actions the "connector" component or other element may be capable of taking on the data as it enters that process step as well as allow for customization of those elements and connectors. Further the chat bot integration-process modeling user interface in an embodiment may allow the user to choose the data set or data element upon which the action will be taken. The action and data element may be selected by the user via a separate user interface called a connector import wizard in some embodiments, as described herein. Such a connector import wizard may be used to customize player options, for example, in one embodiment. In another embodiment, a connector import wizard may be used to configure access to a fulfillment and response database as well as for customization of determinations of customized keywords, synonyms, and responses for both non-dynamic or dynamic responses to chat bot queries. The action and data element the user chooses may be associated with a connector code set, which may be pre-defined and stored at a system provider's memory in an embodiment. The service provider server/system in an embodiment may generate a dynamic runtime engine for executing these pre-defined subsets of code instructions correlated to each individual process-representing visual element (process component), such as icons, in a given flow diagram. The service provider system or an enterprise system may generate a dynamic runtime engine for a customized chat bot integration software system. Generating the dynamic runtime engine may be based on the order in which connectors or elements are modeled in the given flow diagram of the chat bot integration process-modelling user interface 500 according to various embodiments.

As shown in FIG. 5A, such process-representing visual elements may include a start element, an initial application state element 502, a chat bot start element 504, and a flowchat application element 506. The process-representing visual elements are shown as a process flow on a chat bot integration process-modeling user interface 500 for utilizing flow templates to develop the customized chat bot integration software system. An example embodiment of a chat bot integration process-modeling user interface 500 may include Dell Boomi Atomsphere®, or Boomi Flow® and Boomi Integrate® tools.

The initial application state element 502 provides for creating an App State object value and setting values identifying the chosen bot and version within the natural language processing platform chosen. This provides for an ability to choose among multiple bots at one or more natural language processing platforms if desired. Further, the initial application state element 502 allows for setting chatlog builder values for the bot window presented including chat bot interface player colors, avatar graphics and names, initial welcome messages and the like. Further, values are set with respect to tracking chats on the chat bot or logging purposes and accessing tables, for example, within the fulfillment and response database.

Chat start 504 provides for a connector to the chat bot flows and for connection of feedback loops from "B" and "E" from elsewhere in the chat bot integration process-modeling user interface for a customized chat bot integration software system. Flowchat application element 506 is the user interface presentation in which a chat bot welcome message or response is presented to a customer or other user of the chat bot and in which the customer or user asks their question. The flowchat application element 506 drives the chat bot user interface for providing messages via a graphical user interface, a voice driven user interface, an SMS or MMS user interface or other type of chat bot conversation query and response delivery system to a chat bot user.

Flow proceeds to elements including add user message reset chatlog builder 508, is follow up question determiner 510, operate request log element 512, update chattrack element 514, and log user input and prepare response value 516. At add user message reset chatlog builder 508, the chatlog builder is reset for a new chat. The chatlog builder is populated with values indicating properties such as appearance of chat bot messages relative to customer/user messages and the values of an initial customer or user chat bot query. The new request is also added to a chatlog list for tracking and collecting messages by message content from the visible conversation in the chat bot user interface. Follow up question determiner 510 determines whether the new query is a clarification question that has looped to clarify a previous intent of an ongoing chat conversation, or if a new full response is required to a chat bot query. If clarification of a previous chat bot conversation message looped back, the follow up question determiner element 510 proceeds to the log user input and prepare response value element 516 discussed further below. If, however, the chat bot query is a new query requiring a full response, the chat bot integration process-modeling user interface for a customized chat bot integration software system process flow proceeds to the operate request log element 512.

At the operate request log element 512, the customized chat bot integration software system operation flow updates the reporting chattrack values with the new request information in preparation to save the new request as a new request and its details or identification to the fulfillment and response database. Then the system proceeds to the update chattrack element 514 to save the reporting chattrack values to the fulfillment and response database with details of the received new customer or user chat bot request. The customized chat bot integration software system process flow then proceeds to the log user input and prepare response value element 516.

At the log user input and prepare response value element 516 of the customized chat bot integration software system process flow sets an application state and last user input value to be reflective of the new or follow up user chat bot query request message, and prepares for the natural language processing platform reply object value. The customized chat bot integration software system process flow proceeds next to the query bot element 518 where it sends a call to the natural language processing platform. The call to the natural language processing platform includes identification of the previously set up bot to call and the user input message of the chat bot query. The query bot element 518 receives back simple responses or recognized intent/slot values relevant to parsing the language of the new or follow-up chat bot query submitted to the natural language processing platform. Values may include a dialog state value, intent name, any simple bot reply values, a reply format including any additional slots needing information, a response card, session attribute values, and slots to elicit further information, and a slot list that may be utilized for formulating customized responses when a dynamic response is needed to fulfill a chat bot query. The customized chat bot integration software system process flow will proceed to "A" and FIG. 5B.

FIG. 5B is a continuation of process-representing visual elements for the chat bot integration process-modeling user interface of a customized chat bot integration software system process flow according to an embodiment. The process-representing visual elements are shown as a process flow on a chat bot integration process-modeling user interface 500 to develop the customized chat bot integration software system. At the set application state element 520, the customized chat bot integration software system process flow will set an application state and active intent value to the intent name returned by the natural language processing platform. This identifies the one or more intents parsed from the submitted chat bot query. The process flow then proceeds to a fulfillment routing element or connector 522 to determine based on business rules whether a response provided directly from the natural language processing platform is a valid response, such as with a simple chat bot query, or whether a dynamic fulfillment is required to formulate a customized response via the business process integration capabilities of the customized chat bot integration software system process flow. Three potential paths may be followed in an example embodiment.

The customized chat bot integration software system process flow may utilize artificial intelligence, business process rules, and logic to determine which path to follow at the fulfillment routing element 522. A determination via the artificial intelligence and comparison to previous, learned responses and intents may be used to determine in a first case that a response directly from a natural language processing platform may be used. This may include learned application of custom responses added during the course of training, such as by an administrator or via learned responses from previous chat bot conversations. For example, for the first path, the customized chat bot integration software system process flow may operate the bot reply 524 meaning it may utilize the natural language processing platform chat bot reply provided. These provided replies may be of three categories in an example embodiment. The provided response may simply be a clarification of intents determined in the chat bot query. For example, an intent verification of a "find" query may seek to determine if it relates to a "whereis" intent, a "whois" intent, or another intent discerned from a chat bot query. The slot associated in combination with the identified intent may be an easily accessible data source. For example, a "whereis" intent linked with a known slot keyword such as "your offices" may provide an easily fulfilled response including the enterprise address. In another example embodiment, the natural language processing platform may involve a simple fulfillment response such that a dynamic response is unnecessary. The customized chat bot integration software system process flow may then assign the simple fulfillment response from the natural language processing platform in the chat bot conversation. For example, a response of "your welcome" to an expression of thanks in an intent or a simple answer to a question about an address or other basic information for an enterprise may be returned by the natural language processing platform chat bot to the customized chat bot integration software system process flow in some embodiments. In another example embodiment, the natural language processing platform may have been unable to parse or discern the chat bot query to find intents or a response to a query such that a default no answer found response may be provided. This may be assigned within the customized chat bot integration software system process flow for response in the chat bot conversation.

Upon determining that a non-dynamic natural language processing response to a chat bot query has been determined to be useable at the bot reply element 524, flow proceeds to an is answer or miss determiner element 526. The is answer or miss determiner element 526 is invoked to determine the next steps from among the possibilities of whether an intent clarification was received, whether a simple natural language process platform response provided was received, or whether a default no answer found response was received above. If a successful simple answer was received by the customized chat bot integration software system process flow at operate the bot reply element 524, then the chat bot query may be designated as answered and proceed to the operate answer element 528. The operate answer element 528 populates a value indicating the answer was successfully made for logging the fulfillment of the chat bot query and such is reported to the chattrack log as well as recording the answer provided. Then the save basic answer element 530 saves the answer made and its value to the fulfillment and response database for tracking and applying learning statistics to the responses which may be used for future fulfillment determinations. The customized chat bot integration software system process flow may then proceed to the update chattrack values at 538 in the chat progress monitoring database, and proceed back to "B" to feedback to the chat start element 504. Then at the flowchat application element 506 the customized chat bot integration software system presents the response to a customer or user of the chat bot via a chat bot interface player that is graphical or a voice system.

If the answer or miss determiner element 526 determines a missed question has occurred and a default no answer found response was received from a natural language processing platform, an operate miss element 532 may be invoked by the customized chat bot integration software system process flow. The operate miss element 532 populates a value indicating the answer was missed for logging the fulfillment of the chat bot query and such is reported to the chattrack log as well as recording the default no answer found response provided. Then the save miss element 534 saves the miss and its value to the fulfillment and response database for tracking and applying learning statistics to the responses which may be used for future fulfillment determinations. This may be addressed with further training to avoid future misses. Customized administrator training is one option as is artificial intelligence application of categorization of answers to apply responses to intents and slots as the customized chat bot system operates. The customized chat bot integration software system process flow may then proceed to the update chattrack values at 538 in the chat progress monitoring database and proceed back to "B." "B" then feeds back to the chat start element 504 and the flowchat application element 506 to present the default no answer found response to a customer or user of the chat bot via a chat bot interface player that is graphical or a voice system.

If answer or miss determiner element 526 determines that an intent clarification was received, the customized chat bot integration software system process flow proceeds to an operate clarification element 536 to populate the missed request with a flagged clarification of intent value for logging of fulfillment and response purposes. The customized chat bot integration software system process flow proceeds to the save miss element 534 saves the miss and its value to the fulfillment and response database for tracking and applying learning statistics to the responses which may be used for future fulfillment determinations. Then customized chat bot integration software system process flow may proceed to the update chattrack values at 538 in the chat progress monitoring database and proceed back to "B" to feedback to the chat start element 504. At the flowchat application element 506, the system may present the response seeking clarification of a recognized intent response to a customer or user of the chat bot via a chat bot interface player that is graphical or a voice system.

Returning to the fulfillment routing element 522, the customized chat bot integration software system process flow may instead determine that a dynamic response is required to supplement the received response or recognition of intents and slot values for the chat bot query. In a first instance, a path may be used with the returned intent name and slot name parsed by the natural language processing platform to load a granular, keyword specific response from a database. In such a way, a single intent may have several keyword specific answers. The customized chat bot integration software system process flow may proceed to "D" and the operate dynamic intent element at 544 in FIG. 5C below. For example, if a recognized intent is a "how much is" intent and a slot identifies a potential product or service, the access may need to be to internal database options to provide an answer. In another instance, a path may be used executing an atom business integration process to obtain data from an external system where such an atom business integration process is one developed with a business process integrator such as the Dell Boomi© system. In this instance, the customized chat bot integration software system process flow may proceed to "C" and the call atom integration process element at 540 in FIG. 5C below. For example, a query may contain a "how many" intent with a slot querying slots of "of a product" and "deliverable by Tuesday" may involve accessing database information relating to accessible inventory as well as database information relating to shipping possibilities. This may involve a call to an atom integration process to access plural database formats or system locations and types to fulfill the one or more slots in the chatbot query.

FIG. 5C is another continuation of the process-representing visual elements for the chat bot integration process-modeling user interface 500 of a customized chat bot integration software system process flow according to an embodiment. The fulfillment routing element 522 in FIG. 5B may select two other pathways represented by "C" or "D" in the customized chat bot integration software system process flow of FIG. 5C. The dynamic chat bot query response is determined to be required when returned intent name and slot name is parsed by the natural language processing platform. Two example options include using intent and slot identification to either load a granular, keyword specific response from a database at "D" or to execute an atom business integration process to obtain data from an external system to fulfill the response and provide data for custom slots in the query response such as at path "C".

At pathway "C", the customized chat bot integration software system process flow proceeds to a call atom integration process element 540 to access external database or cloud resources to fulfill a chat bot query based upon identified intent slot pairs. The call atom integration process element 540 passes an intent name and at least one slot name to a business process integration to access external database options for data retrieval and response generation to fill in data corresponding to slot information for a chat bot query dynamic response. The customized chat bot integration software system process flow proceeds to an operate atom response element 542. The an operate atom response element 542 populates the data from the integration process data retrieval from an external database, including accommodation of one or more formatting options and data source system types, into a chat bot response message and sets the reply value as having been met. Proceeding next to an add bot message reset element 552, this element populates the chatlog builder object with a response message including the retrieved data from the integration process and conforms to any interface configurations, and then adds the value of the composed response message to the chatlog list for a log record of the conversation. An operate answer card element 554 includes tracking of chat bot conversation progress provides an answer made value to a recorded chattrack and answers values and records the answer and status of the chat bot conversation and fulfillment at the fulfillment and responses database for future data reference and learning. Then the save answer element 556 saves the answer composed in a dynamic response to intent plus slot identification with the retrieved external database or cloud data source information included for a dynamic response. The customized chat bot integration software system process flow feeds back to the chat start element 504 and flowchat application element 506 of FIG. 5A through "E." At the flowchat application element 506, the dynamic response is presented to a customer or user of the chat bot via a chat bot interface, voice system, or other delivery method.

Returning to the fulfillment routing element 522 selecting pathway "D", a dynamic database response is determined and the customized chat bot integration software system process flow proceeds to an operate dynamic intent element 544. The operate dynamic intent element 544 sets the flow chat values such that a first slot value, for example, is equal to a first item from a response database object/slot list value have a corresponding list value. Such object/slot list values may be associated with learned values that correspond to intent-slot pairs or correspond with slots as identified from a natural language processing platform. Several potential list values may also be available and categorization engines may determine a best fit to an intent and slot pair or relative to previous, similar chat bot queries in an embodiment. In some embodiments, categorization engines may determine an appropriate value from a list based on previous successful responses or on customized adjustments to responses by an administrator due to misses or even to modify successful responses.

At get dynamic reply element 546, the customized chat bot integration software system process flow loads the response from the chat_replies database of the fulfillment and responses database table and applies several filters to select the selection of the response. Next, at is blank element 548, the customized chat bot integration software system process flow conducts a redundancy check on whether a valid response was received from the database call to load a selected response from the fulfillment and response database. If the redundancy check fails at 548, a default response is provided in the message response at the operate default element 550. If the redundancy check indicates a found item in the database call to the fulfillment and response database for the intent and slot pair, that loaded response is utilized for a customized chat bot query response.

Proceeding to the add bot message reset element 552, either the default message due to the redundancy check failure, or the found message, is populated in the chatlog builder object with the response message including the retrieved data from the database call to the fulfillment and response database. Then the customized chat bot integration software system process flow adds the value of the composed response message to the chatlog list for a log record of the conversation. An operate answer card element 554 includes tracking of chat bot conversation progress, and provides an answer made value to a recorded chattrack and answers values. It may record the answer and status of the chat bot conversation and fulfillment at the fulfillment and responses database for future data reference and learning. Then the save answer element 556 saves the answer composed in this dynamic response route utilizing the fulfillment and response database call to the intent plus slot or slots identification of the chat bot query for a dynamic chat bot query response. The customized chat bot integration software system process flow feeds back to the chat start element 504 and flowchat application element 506 of FIG. 5A through "E." The dynamic response, or default responses if results from the database call, is presented to a customer or user of the chat bot via a chat bot interface, voice system, or other delivery method at 506.

Figure 6A:
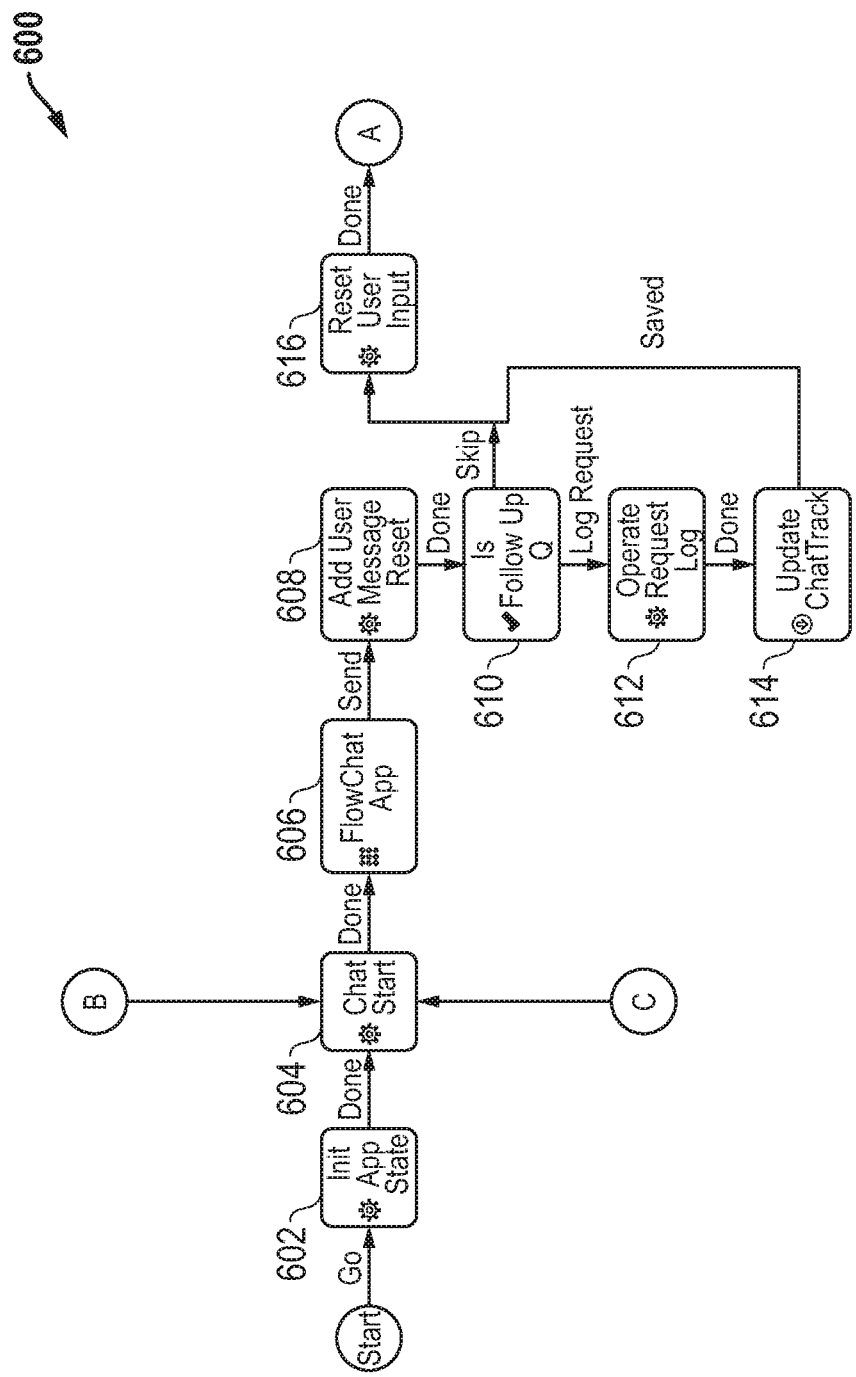
FIG. 6A is a block diagram illustrating a user-generated flow diagram of a custom chat bot integration software system with override follow-on capacity according to an embodiment of the present disclosure.
Figure 6B:
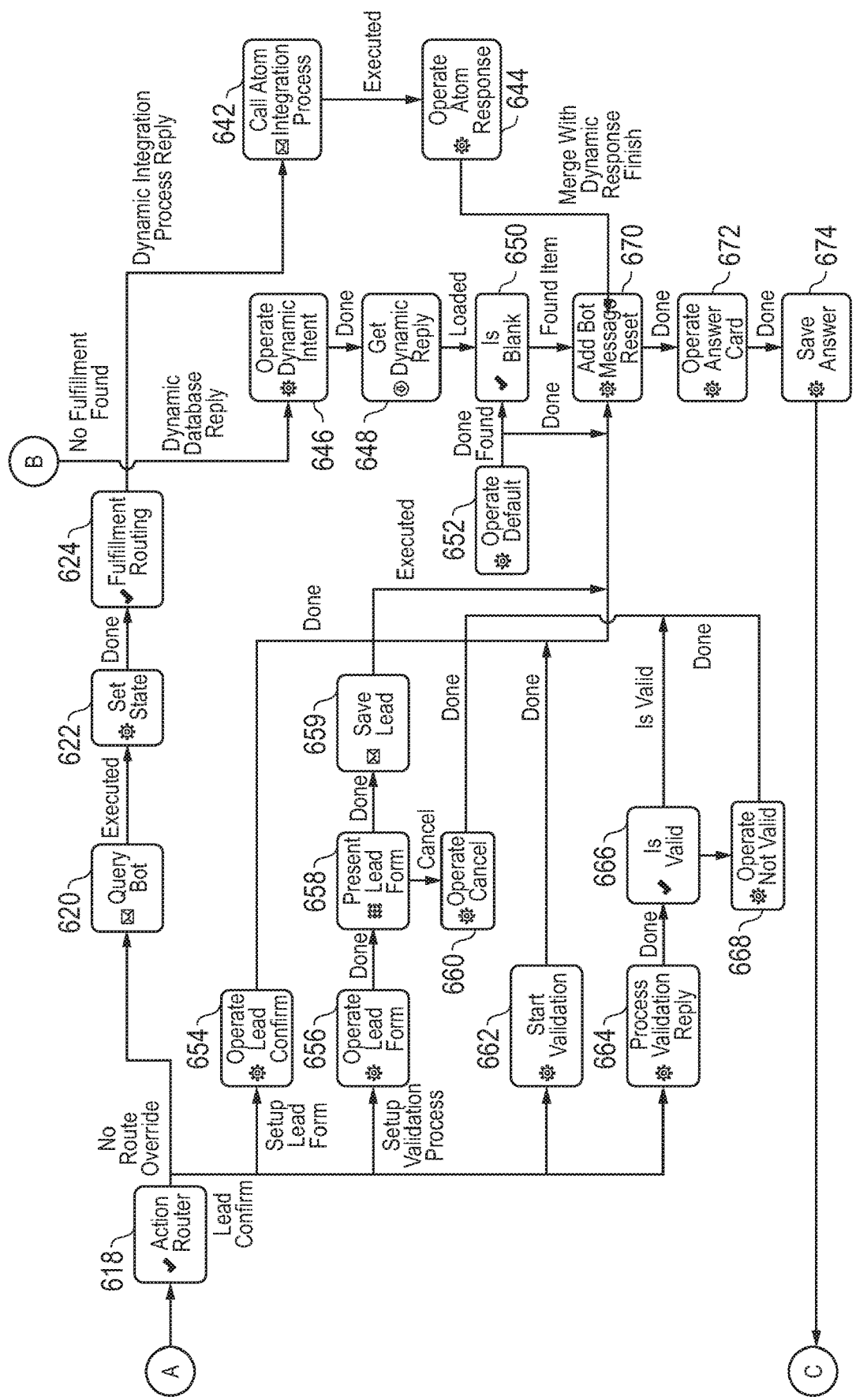
FIG. 6B is a block diagram illustrating a user-generated flow diagram of a custom chat bot integration software system with override follow-on capacity according to an embodiment of the present disclosure.
Figure 6C:
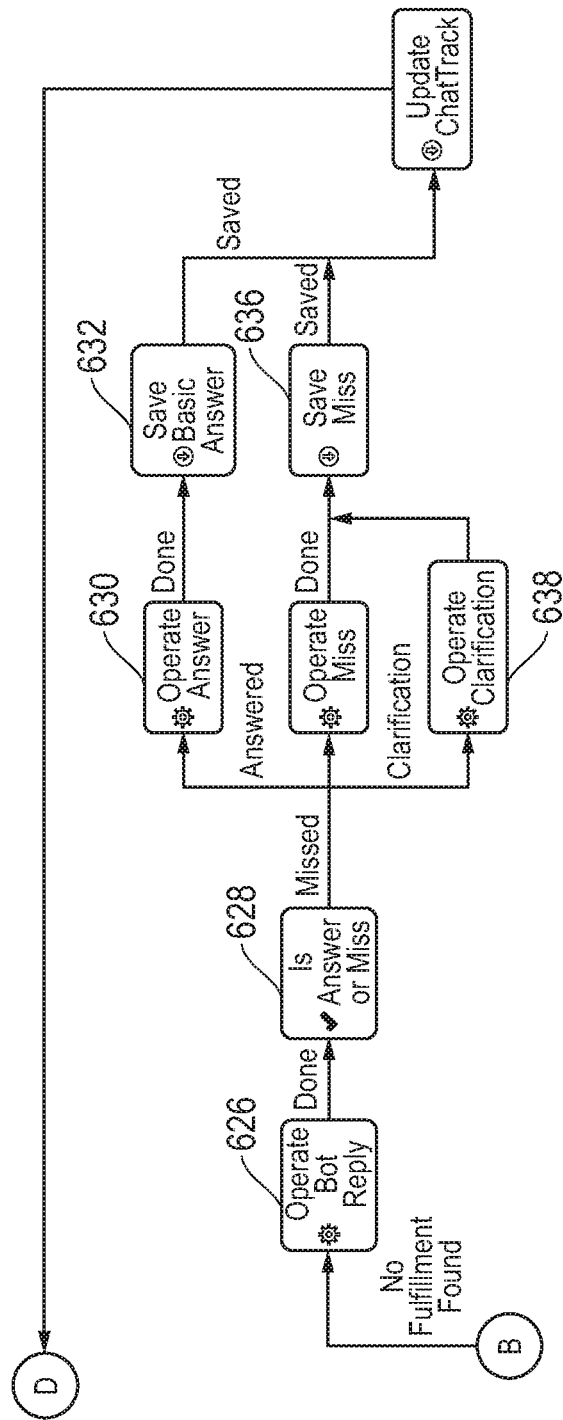
FIG. 6C is a block diagram illustrating a user-generated flow diagram of a custom chat bot integration software system with override follow-on capacity according to an embodiment of the present disclosure.

FIGS. 6A, 6B, and 6C are a block diagram illustrating a user-generated flow diagram of a chat bot integration process for interfacing with a natural language processing platform, a player, a fulfillment and response database, and exchange of electronic data records. The system of the embodiments herein may provide an enhanced, intelligent and customized chat bot integration software system for an enterprise according to another embodiment of the present disclosure. A user may generate a flow diagram in an embodiment by providing a chronology of process-representing integration elements via the use of a chat bot integration process-modeling user interface. In some embodiments, the integration process-modeling user interface may take the form of a visual user interface for importing or establishing flow templates for developing the customized chat bot integration software system. In such embodiments, the user-selectable elements representing integration sub-processes (e.g. connector integration elements) may be visual icons. Examples of the integration process-modeling user interface 600 for utilizing flow templates for developing the customized chat bot integration software system may include Dell Boomi Atomsphere®, or Boomi Flow® and Boomi Integrate® tools in example embodiments.

A chat bot integration process-modeling user interface 600 in an embodiment may provide a design environment permitting a user to import defined process flows such as a bot flow template or an administrative portal flow template. This chat bot integration process-modeling user interface 600 further allows an enterprise to customize and link those process flows between multiple applications/systems. In the present example embodiment, a flow similar to that of FIGS. 5A, 5B, and 5C is depicted with an ability for the customized chat bot integration software system to further include a feature of enabling follow-on chat messages such as follow up questions linked to received customer or chat bot user queries or to enable add on statements or information to provide additional related information on a line of inquiry. Such an override follow-on system in a customized chat bot integration software system may be utilized to trigger a chat bot conversation to provide additional information to a customer or chat bot user by the customized chat bot integration software system. The follow up line of questions or added responses may be triggered based on linking to the identified intent and slot of a chat bot query determined from a natural language processing platform as described in embodiments herein. The follow up questions or add on statements are different from chat bot system capabilities to seek clarification when an intent or slot is not recognized or from prompting questions displayed such as when a customer or chat bot user accesses a chat bot.

The process flows, as described in embodiments herein, may link chat bot operation capability for a service provider for natural language processing platforms, a player, a fulfillment and response database systems for learning and determining customized responses, as well as a plurality of data sources having differing formats and systems for customized response generation. Such a system allows for customized accessibility for intent and slot fulfillment tasks. Multiple data sources may be linked to the customized chat bot integration software system including on-site data centers and cloud-based storage modules, other enterprise systems, or trading partner systems to model a customized chat bot integration process. Each process component as represented by integration sub-process icons or elements may be identifiable by a process component type, and may further include an action to be taken. For example, a process component may be identified as a "connector" component. Each "connector" component or other element, when chosen and added to the process flow in the integration process-modeling user interface, may allow a user to choose from different actions the "connector" component may be capable of taking on the data as it enters that process step. Further the chat bot integration-process modeling user interface in an embodiment may allow the user to choose the data set or data element upon which the action will be taken. The action and data element may be selected by the user via a separate user interface called a connector import wizard in some embodiments, as described herein. The action and data elements or parameter settings may be selected for connectivity to a fulfillment and response database that may, for example, manage chatlog, chattrack, chatlog builder systems, chat_replies tables or database, application states, and other response and fulfillment databases to enable operation of the customized chat bot integration software system. Such a connector import wizard may be used to customize options within any of the elements of the customized chat bot integration software system process flow in an embodiment.

As shown in FIG. 6A, process-representing visual elements may include a start element, an initial application state element 602, a chat bot start element 604, and a flowchat application element 606. The process-representing visual elements are shown as a process flow on a chat bot integration process-modeling user interface 600 for utilizing flow templates to develop the customized chat bot integration software system. An example embodiment of a chat bot integration process-modeling user interface 600 may include Dell Boomi Atomsphere®, or Boomi Flow® and Boomi Integrate® tools.

The initial application state element 602 provides for creating an App State object value and setting values identifying the chosen bot and version within the natural language processing platform chosen similar to embodiments described herein. Further, the initial application state element 602 allows for setting chatlog builder values for the bot window presented as user interface details for a visual user interface, voice generated system, or other chat bot delivery system such as SMS or MMS systems. Further, values are set at the initial application state element 602 for tracking chats on the chat bot, for logging purposes, and or for accessing tables or other relevant data sources within the fulfillment and response database for the chat bot conversation.

Chat start 604 provides for a connector to the chat bot flows and for connection of feedback loops from "B" and "E" from elsewhere in the chat bot integration process-modeling user interface for a customized chat bot integration software system. Flowchat application element 606 is the user interface presentation, voice chat bot conversation presenter, SMS or MMS, or other chat bot interface player system in which a chat bot welcome message or any generated responses, whether dynamic or not dynamic is presented to a customer or other user of the chat bot. It is also the chat bot interface player where the customer or chat bot user asks their question. Further, follow up questions or add on statements related to the intent and slot combinations parsed from a chat bot query or queries may also be presented to a customer or chat bot user here.

Flow proceeds to elements including add user message reset chatlog builder element 608, is follow up question determiner element 610, operate request log element 612, update chattrack element 614, and log user input and prepare response value 616. At add user message reset chatlog builder 608, the chatlog builder is reset for a new chat. The chatlog builder is populated with values indicating properties such as appearance of chat bot messages relative to customer/user messages and the values of an initial customer or user chat bot query. The new request is also added to a chatlog list for tracking and collecting messages by message content from the visible conversation in the chat bot user interface. Follow up question determiner 610 determines whether the new query is an intent clarification question that has looped to clarify a previous intent of an ongoing chat conversation or if a new full response is required to a chat bot query. If clarification of a previous chat bot conversation message has looped back, the follow up question determiner element 610 proceeds to the log user input and prepare response value element 616 discussed further below. If, however, the chat bot query is a new query requiring a full response, the chat bot integration process-modeling user interface for a customized chat bot integration software system process flow proceeds to the operate request log element 612.

At the operate request log element 612, the customized chat bot integration software system operation flow updates the reporting chattrack values with the new request information in preparation to save the new request as a new request and its details or identification to the fulfillment and response database. Then the system proceeds to the update chattrack element 614 to save the reporting chattrack values to the fulfillment and response database with details of the received new customer or user chat bot request. The customized chat bot integration software system process flow then proceeds to the log user input and prepare response value element 616.

At the log user input and prepare response value element 616 of the customized chat bot integration software system process flow sets an application state and last user input value to be reflective of the new or intent clarification follow up user chat bot query request message and prepares for the natural language processing platform reply object value. At this point, flow proceeds to "A" and to the action router element 618 of FIG. 6B.

FIG. 6B is a continuation of process-representing visual elements for the chat bot integration process-modeling user interface of a customized chat bot integration software system process flow according to an embodiment. The process-representing visual elements are shown as a process flow on a chat bot integration process-modeling user interface 600 to develop the customized chat bot integration software system.

The action router element 618 is a connector that supports routing an override to chat bot operation that differs from that described above in the embodiments of FIGS. 5A, 5B, and 5C. In some chat bot scenarios it may be desired to follow up on leads in a chat bot conversation to provide additional detail, offer services, or provide a link to customer support. When such a lead is detected for follow up questions or add on statements related to one or more previously parsed intent and slot combination(s), the override may generate responses or add on statements to pursue the lead of continued chat bot conversation. Several lead actions may occur in an override case upon flow reaching the action router element 618. In an example embodiment, an override may be triggered upon determination that a long threaded chat bot conversation has been conducted. A threshold may be used such as two or more or three or more exchanges with a chat bot user in some example embodiments. Any number of exchanges may be used as a threshold in various embodiments, or a count may begin during a topical line of chat bot conversation in other embodiments. Several paths of this override flow are available for the customized chat bot integration software system process flow at action router element 618. Options may include the action router 618 determining to pursue paths for a lead confirm action, a validate action, a validate reply action, or a lead form action.

Utilizing the content manager of a template bot administration portal flow template, an administrator can set route override keywords when a particular intent or intent and slot combinations are encountered. If one of these intents or intent and slot combinations are encountered at the action router element 618, the call to a natural language processing platform may be delayed or the chat bot query managed differently. This special handling may first present a lead form within a chat bot user interface and move through a sequence of requests and validation checks to gather a customer or chat bot user contact information such as a name, phone number, or email address.

The customized chat bot integration software system process flow may proceed on a special handling path to an operate lead confirm element 654. At the operate lead confirm element 654, a chatlog builder establishes a lead-confirm value and may present to a customer or chat bot user an inquiry of whether an immediate outreach from a sales rep is desired or if a user would like to submit a form for additional information. Such a follow up request about immediate outreach or form submission is routed to an add bot message reset element 670 to feedback via the operate answer card 672, save answer 674 and back through "C" to chatstart element 604 and flowchat application 606 to present the follow up query. A follow-on query or message about immediate sales rep outreach or submission of a form for information may be presented via a chat bot interface. Then the process may return via the previously described elements to the override special handling pathway.

The action router 618 will route the next loop depending on the response provided to the follow up question presented. If a customer or user indicates no desire to receive sales rep outreach or submit a form for further information, the customized chat bot integration software system process flow may proceed under normal logic to query bot element 620 to query a natural language processing platform to parse intents and slots. If, however, at action router 618 in the next loop it is determined that the customer or chat bot user would like to receive additional information, the system may proceed to an operate lead form element 656 to set up a modified user interface to support a form of input fields for the user to request more input fields. At present lead form 658, the user interface presents the lead form for the customer or chat bot user to request more information. If submitted, the form is saved at 659. The lead is saved to an appropriate database or databases via the atom integration process according to embodiments herein. If not, the operate cancel element 660 is utilized to set up a chatlog builder value to prompt for a new chat bot query request and clears the route override values. In either scenario, the customized chat bot integration software system process flow proceeds to the add bot message reset element 670 to prepare to loop back to flowchat app element 606 to continue with the next looped step in a chat bot conversation.

If at action router 618 in the next loop it is determined that the customer or chat bot user would like to redirect outreach by a sales rep this initiates a start validation element 662. The start validation element 662 will run a script of responses to prompt for contact information data points from a customer or chat bot user. For example, the request may be for a name, phone number contact, and an email in an example embodiment. Then a route override value is set for the next loop to engage in the process validation. The customized chat bot integration software system process flow proceeds to add bot message reset element 670 and to feedback via "C" to flowchat app element 606 to present the request or requests for contact information.

Upon return of the next loop to the action router 618, the customized chat bot integration software system process flow proceeds then to the process validation reply element 664 to operate a script to check for existence of name and phone or to check for email address format validity. At is valid element 666, this determines whether any required information is missing or whether some of the received contact information is invalid. If sufficient and valid, then the customized chat bot integration software system process flow proceeds to proceeds to add bot message reset element 670 to feedback via "C" to flowchat element 604 to present to confirm receipt of the contact information and prompt any additional chat bot queries or provide another customized message. If insufficient or invalid contact information is received, operate not valid element 668 inputs to the chatlog builder object a request for additional or corrected contact information. Then flow proceeds to add bot message reset element 670 and to feedback via "C" to flowchat app element 606 to present the request or requests for additional or corrected contact information.

When no override action is determined to be needed at the action router element 618 or the special handling override paths are finished but an additional chat bot query is pending, then the customized chat bot integration software system process flow proceeds to a query bot element 620 that sends a call to the natural language processing platform including identification of the previously set up bot to call and the user input message of the chat bot query. This path is similar to the process of the embodiments of FIGS. 5A, 5B, and 5C and the customized chat bot integration software system process flow proceeds as before. The query bot element 620 receives back simple responses or recognized intent/slot values relevant to parsing the language of the new or follow-up chat bot query submitted to the natural language processing platform. Values may include a dialog state value, intent name, any simple bot reply values, a reply format including any additional slots needing information, a response card, session attribute values, and slots to elicit further information, and a slot list that may be utilized for formulating customized responses when a dynamic response is needed to fulfill a chat bot query.

The customized chat bot integration software system process flow will proceed to the set application state element 622, the customized chat bot integration software system process flow will set an application state and active intent value to the intent name returned by the natural language processing platform for identification of one or more intents parsed from the submitted chat bot query. The process flow then proceeds to a fulfillment routing element or connector 624 to determine based on business rules whether a response provided directly from the natural language processing platform is a valid response that is usable, or whether a dynamic fulfillment is required to formulate a customized response via the business process integration capabilities of the customized chat bot integration software system process flow. Three potential paths may be followed at the fulfillment routing element 624 as described in previous embodiments herein.

The customized chat bot integration software system process flow may utilize artificial intelligence, business process rules, and logic to determine which path to follow at the fulfillment routing element 624. A determination via the artificial intelligence and comparison to previous, learned responses and intents may be used to determine in a first case that a response received from a natural language processing platform may be used. For example, for the first path through "B," the customized chat bot integration software system process flow may operate the bot reply element 626 in FIG. 6C

As shown in FIG. 6C, which is a block diagram showing a continuation of the chat bot integration process-modeling user interface 600, the flow continues from "B" to the operate bot reply element 626. The operate bot reply element 626 may utilize the natural language processing platform chat bot reply provided. These natural language processing platform provided replies may be of three categories in an example embodiment. The provided response may simply be a clarification of intents determined in the chat bot query, such that verification of a "find" query relates to a "whereis" intent rather than a "whois" or another intent discerned from a chat bot query. In another example embodiment, the natural language processing platform may identify a simple query involving a simple fulfillment response such that a dynamic response is unnecessary. The customized chat bot integration software system process flow may then assign the simple fulfillment response from the natural language processing platform in the chat bot conversation. For example, a response of "your welcome" to an expression of thanks or a simple answer to a question about an address or other basic information for an enterprise may be returned by the natural language processing platform chat bot to the customized chat bot integration software system process flow in some embodiments. In another example embodiment, the natural language processing platform may have been unable to parse or discern the chat bot query to find intents or a response to a query such that a default no answer found response may be provided. This may be assigned within the customized chat bot integration software system process flow for the response in the chat bot conversation.

Upon determining that a chat bot query has been determined by the customized chat bot integration software system process flow to operate the bot reply 626, an is answer or miss determiner element 628 may be invoked to determine the next steps from among the possibilities of whether an intent clarification was received, whether a simple natural language process platform response provided was received, or whether a default no answer found response was received above. If a successful simple answer was received by the customized chat bot integration software system process flow at operate the bot reply element 626, then the chat bot query may be designated as answered and proceed to the operate answer element 630 to proceed with the successful answer similar to as described with respect to the embodiments above, for example in FIGS. 5A, 5B, and 5C. Values for logging of fulfillment and tracking are established. Then the save basic answer element 632 saves the answer made in the fulfillment and response database. The customized chat bot integration software system process flow may then proceed to the update chattrack values at 640 in the chat progress monitoring database and proceed back to "D" to feedback to the chat start element 604 and flowchat app element 606 and present the response to a customer or user of the chat bot via a user interface or voice system.

If the answer or miss determiner element 628 determines a missed question and a default no answer found response was received from a natural language processing platform, an operate miss element 634 may be invoked by the customized chat bot integration software system process flow to log and update values that the answer was missed. Then the save miss element 636 saves the miss and its value to the fulfillment and response database for tracking and applying learning statistics to the responses which may be used for future fulfillment determinations. The customized chat bot integration software system process flow may then proceed to the update chattrack values at 640 in the chat progress monitoring database and proceed back to "D" to feedback to the chat start element 604 and the flowchat app 606 to present the default no answer found response to a customer or user of the chat bot via a user interface or voice system.

If answer or miss determiner element 628 determines that an intent clarification was received, the customized chat bot integration software system process flow proceeds to an operate clarification element 638 to populate the missed request with a flagged clarification of intent value for logging of fulfillment and response purposes. The customized chat bot integration software system process flow proceeds to the save miss element 636 saves the miss and its value to the fulfillment and response database for tracking and applying learning statistics to the responses which may be used for future fulfillment determinations. Then customized chat bot integration software system process flow may proceed to the update chattrack values at 640 in the chat progress monitoring database and proceed back to "D" to feedback to the chat start element 604 and flowchat app 606 to present the response seeking clarification of a recognized intent response to a customer or user of the chat bot via a user interface or voice system.

Returning to the fulfillment routing element 624 of FIG. 6B, the customized chat bot integration software system process flow may determine that a dynamic response is required to supplement the received response or recognition of intents and slot values for the chat bot query from the natural language processing platform. In a first instance, a path may be used with the returned intent name and slot name parsed by the natural language processing platform to load a granular, keyword specific response from a database. In such a way a single intent may have several keyword specific answers. The customized chat bot integration software system process flow may proceed to the operate dynamic intent element at 646. In another instance, a path may be used executing an atom business integration process to obtain data from an external system where such an atom business integration process is one developed with a business process integrator such as the Dell Boomi© system. In the latter instance, the customized chat bot integration software system process flow may proceed to the call atom integration process element at 642.

If a dynamic chat bot query response is determined to be required when returned intent name and slot name parsed by the natural language processing platform may be used to execute an atom business integration process to obtain data from an external system to fulfill the response and provide data for custom slots in the query response the customized chat bot integration software system process flow proceeds to a call atom integration process element 642 to access external database or cloud resources to fulfill a chat bot query based upon identified intent slot pairs. The call atom integration process element 642 passes an intent name and at least one slot name to a business process integration to access external database options for data retrieval and response generation to fill in data corresponding to slot information for a chat bot query dynamic response. At the operate atom response element 644, the customized chat bot integration system flow populates the data from the integration process data retrieval from an external database, including accommodation of one or more formatting options and data source system types, into a chat bot response message and sets the reply value as having been met. Proceeding next to an add bot message reset element 670, this populates the chatlog builder object with a response message including the retrieved data from the integration process and conforms to any interface configurations and then adds the value of the composed response message to the chatlog list for a log record of the conversation. This is done in preparation for looping back to the flowchat app 606 for presentation of the response to the user or customer via the chat bot user interface. An operate answer card element 672 for tracking of chat bot conversation progress provides an answer made value to a recorded chattrack and records the status of the chat bot conversation and fulfillment status at the fulfillment and responses database for future data reference and learning. Then the save answer element 674 saves the answer composed in the dynamic response to intent plus slot or slots association with the retrieved external database or cloud data source information included for a dynamic response. The response is saved and recorded. The customized chat bot integration software system process flow feeds back to the chat start element 604 and flowchat application 606 of FIG. 6A via "C" where the dynamic response is presented to a customer or user of the chat bot via a user interface, voice system, or other delivery method.

Returning to the fulfillment routing element 624, the customized chat bot integration software system process flow may determine that a dynamic response is required to supplement the received response or recognition of intents and slot values for the chat bot query via loading a granular, keyword specific response from a database. The customized chat bot integration software system process flow proceeds to an operate dynamic intent element 646. The operate dynamic intent element 646 sets the flow chat values such that a first slot value, for example, is equal to a first item from a response database object/slot list value with a corresponding list value. Such object/slot list values may be associated with learned values that correspond to intent-slot pairs or correspond with slots as identified from a natural language processing platform. Several potential list values may also be available and categorization engines may determine a best fit to an intent and slot pair or relative to previous, similar chat bot queries in an embodiment. In some embodiments, categorization engines may determine an appropriate value from a list based on previous successful responses or on customized adjustments to responses by an administrator due to misses or even to modify successful responses. At get dynamic reply element 648, the customized chat bot integration software system process flow loads the response from the chat replies database of the fulfillment and responses database table and applies several filters to select the response elements for a slot.

At is blank element 650, the customized chat bot integration software system process flow conducts a redundancy check on whether a valid response was received from the database call to load a selected response from the fulfillment and response database. If the redundancy check fails at 650, a default response is provided in the message response at the operate default element 652. If the redundancy check indicates a found item in the database call to the fulfillment and response database for the intent and slot pair is valid, that loaded response is utilized. Proceeding to the add bot message reset element 670, either the default message due to the redundancy check failure or the found message is populated in the chatlog builder object with the response message including the retrieved data from the database call to the fulfillment and response database.

Then the customized chat bot integration software system process flow adds the value of the composed response message to the chatlog list for a log record of the conversation. An operate answer card element 672 tracking of chat bot conversation progress is updated as described and then the save answer element 674 saves the answer composed in this dynamic response route utilizing the fulfillment and response database call and association with the intent plus slot or slots of the chat bot query. Thus, a dynamic chat bot query response is prepared for presentation to a customer or chat bot user. The customized chat bot integration software system process flow feeds back to the chat start element 604 and the flowchat app element 606 of FIG. 6A through "C" where the dynamic response, or a default response if results from the database call are invalid, is presented to a customer or user of the chat bot via a user interface, voice system, or other delivery method.

Figure 7:
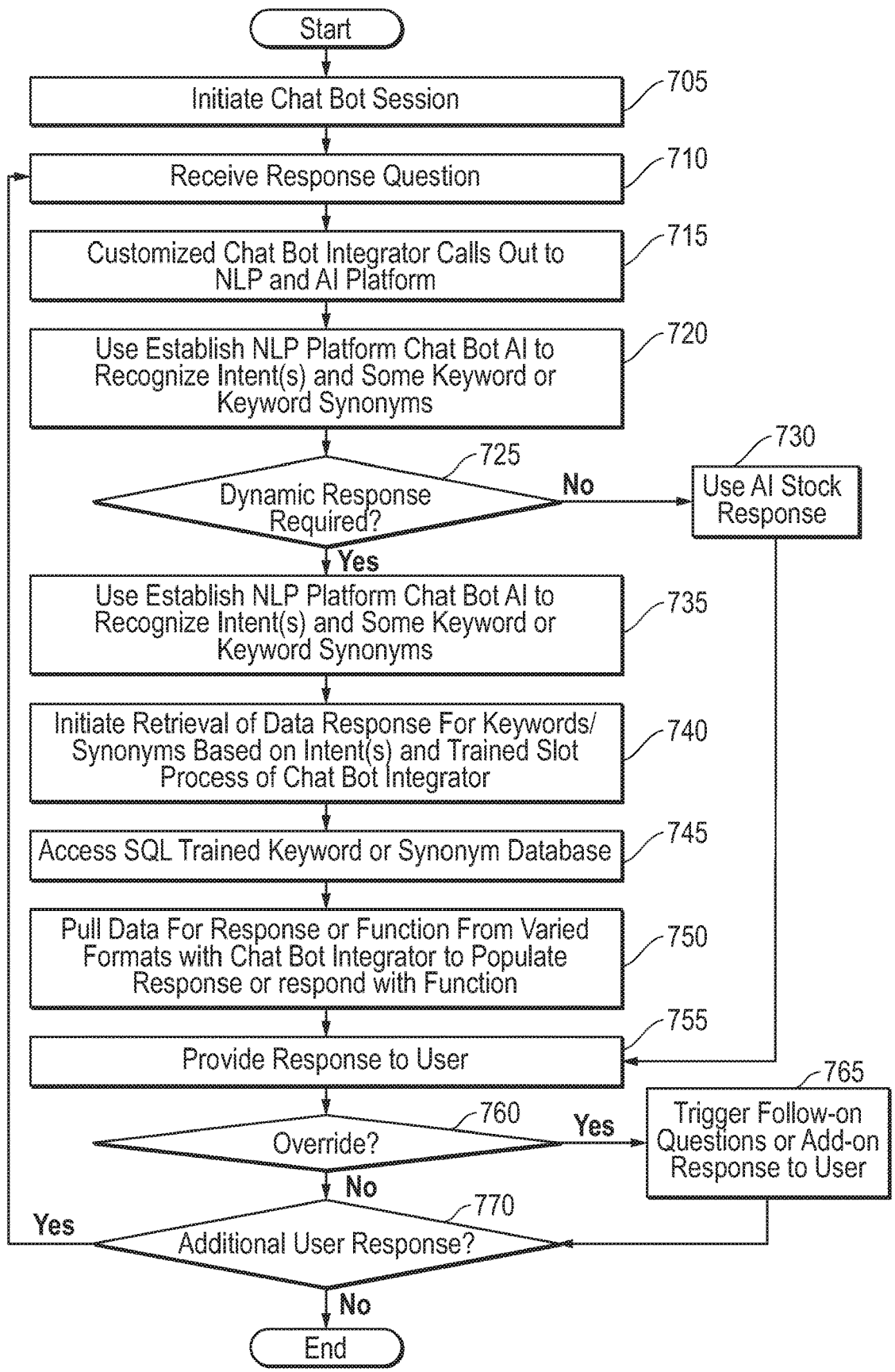
FIG. 7 is a flow diagram illustrating a method of operating a custom chat bot integration software system according to an embodiment of the present disclosure.

FIG. 7 is a flow diagram illustrating a method of and utilizing a transmitted custom connector code set and a run-time engine capable of executing that code set for a customized chat bot integration software system according to an embodiment of the present disclosure. The custom connector code set is formed and customized according to example embodiments above via importation of one or more chat bot flow templates into a chat bot integration process-modeling user interface to develop the customized chat bot integration software system.

At block 705, in an embodiment, the customized chat bot integration software system may receive identification of an initiation of a chat bot session via a chat bot user interface. As described in embodiments herein, a chat bot user interface may be a graphic user interface such as one embedded in a website, a computer generated voice driven user interface for use with a telephonic system, an SMS or MMS driven chat bot user interface, or any other type of user interface.

At 710, the customized chat bot integration software system may receive a chat bot question or query. With the language of the chat bot query, it is determined if this is an initial query or a looped follow-on conversation by the chat bot user or customer. In some instances, it may also be discerned if the chat bot query or response received may be an intents clarification follow up response or may have been a special handling matter where follow up questions or addition conversation information has been provided via the chat bot with a response from a chat bot user or customer.

If a chat bot query requiring a response has been received at 710, flow may proceed to 715 where the customized chat bot integration software system accesses a previously set-up bot in a natural language processing platform and artificial intelligence system. The natural language processing platform and artificial intelligence system may be of any format or type for use with the customized chat bot integration software system according to the integration capabilities provided by the current embodiments.

Upon the call to the pre-established chat bot at the service provider, the chat bot query language is forwarded at 720 for the natural language processing platform to parse the language and identify the chat bot query intent and additional keywords or keyword synonyms for identification of any slots required for a response. In some embodiments, the natural language processing platform may provide a possible response to the query or a partial response to set up responding to an identified intent. For example, the initial clause in a response may correspond to an identified intent, but a slot may be used to fill a gap in the response with custom data from a business process integration. The custom data returned by the customized chat bot integration software system is from databases within or accessible by the enterprise to provide a custom experience and response to a user of the custom chat bot. In other embodiments, no response may be found and an error message or message seeking further intent clarification may be generated by the natural language processing platform and artificial intelligence service provider.

At 725, the customized chat bot integration software system determines whether a dynamic response is required by associating the identified intent or slots, if any, with data or learned data from a fulfillment and response database which may have customized responses of values identifying where such information may be found. If no dynamic response is required at 725, the received response from the natural language processing platform and artificial intelligence service may be used at 730. For example, a response received to a simple chat bot query from the natural language processing platform may be sufficient as a response. In another example, an error message of a miss on identifying an intent or a message seeking clarification of the intent may be returned and such a natural language processing platform response may be used.

The looping nature of the customized chat bot integration software system generated via the chat bot integration process-modeling user interface in order to conduct a chat bot conversation may cause the flow to proceed to 755 where the response from the natural language processing platform that is sufficient is presented to a chat bot user or customer.

Returning to 725, it may be determined that an intent and one or more slots is identified by the natural language processing platform service requiring a dynamic response. In an example embodiment, to fulfill a slot for a custom response, one or more internal or external databases may need to be accessed via the custom business process integration system developed and integrated with customized chat bot integration software system. The data may be available from data sources having a wide variety of formats or types of systems and for some particularly substantive responses, the data may be accessed from a multitude of sources without the need for custom programming of the chat bot system. Access via business process integration to such a variety of data sources is possible due to the chat bot integration process-modeling user interface. With the chat bot integration process-modelling user interface, creation of a customized chat bot integration software system is possible as described in several embodiments herein.

If the returned intent and one or more slots indicates a chat bot query requiring a dynamic response, flow may proceed to 735. At 735, the customized chat bot integration software system may receive the established natural language processing platform's identification of one or more intents of the query and one or more keywords or keyword synonyms which may indicate slots for particularized responses.

Proceeding to 740, the customized chat bot integration software system may initiate retrieval of data responsive to the identified intents and slots from the natural language process platform. A trained chat bot integrator may be used to determine from the fulfillment and response database the stored experience of previous chat bot conversations and fulfillment of previous chat bot queries to access custom responses, locations where slot fulfilling data may be found, or some combination. At 745, the customized chat bot integration software system may access a keyword and synonym database in the fulfillment and response database, such as an SQL database. Customized keywords and synonyms may have been established during set up or learned via machine learning and categorization engines to clarify identified slot terms returned from a natural language processing platform. In some cases, the fulfillment and response database may contain customized responses to identified intent and slot combinations. In other embodiments, the fulfillment and response database may have values for identification of sources of data or locations of responsive data to identified intent and slot combinations. Such locations may be updated as object codes in "get" operations for example by the customized chat bot integration software system.

Proceeding to block 750, in an embodiment, the system may discern whether a local database is available for matching data responsive to the identified intent and slot or slots combination. If so, a granular response may be customized and prepared as a response to the chat bot query by pulling data and forming the response to the intent and slot or slots combination at 750. In other embodiments, an atom integration system must be used to access external databases, formats, and systems including access credentialed systems for retrieving data that may satisfy the slot requirements of particular intent and slot or slots combinations. In such a case, the business process integration aspect of the customized chat bot integration software system may retrieve data from remote locations or systems. Various values may be stored and logged in chattrack and in tables and databases within the fulfillment and response database. In some aspects, the chat bot conversation progress or status may be logged for managing future loops in the chat bot conversation. In other instances, the customized chat bot integration software system may store learned responses, learned associations with intents and slots identified from the natural language processing platform, and may take administrator inputs for correcting missed query responses to provide a learning and continued customization. In such a way, the low-code generated customized chat bot integration software system may become a powerful and customized chat bot system without custom coding required to provide custom chat bot responses to customer or chat bot user queries. Further, the learning aspect of the customized chat bot integration software system, as well as business process integration, may provide continuously updated information from a changing number of databases available to generate responses. The accessible data sources may continue to be changed or modified in their native formats while the customized chat bot integration software system may respond with current, custom responses. Access to the data in the various accessible databases of a variety of formats provides for continually current customization capability.

At 755, the dynamic response from the natural language processing platform that is generated above in response to the identified intent and slot or slots combination is presented to a chat bot user or customer via a user interface according to embodiments herein. At this point in some embodiments the customized chat bot integration software system may proceed to 760 to determine if an override is triggered to generate follow on questions or add on responses for a user. Not all embodiments require the override option at 760. If no override is triggered or such an optional embodiment is not deployed, the process may proceed to 770 to monitor the chat bot user interface in some embodiments. The chat bot user interface monitoring at 770 may determine if additional user responses or queries are received. If not, the process may end in some embodiments. If an additional query is received, flow returns to 710 to receive the chat bot query input and to proceed with parsing the chat bot query to provide a query response as described above.

In some embodiments, the customized chat bot integration software system may determine based upon the length of an ongoing chat bot conversation or the nature of an identified intent and slot or slots combination at 760 that an override in the chat bot system flow is warranted. If the identified intent and slot combination or length of chat bot conversation triggers an override at 760, flow proceeds to trigger follow-on questions or add-on responses triggered by the identified intent and slot combinations in some embodiments. For example, if a particular topic on inquiry is received by the customized chat bot integration software system, it may trigger a lead for a business to provide additional information or for a potential sale of products or services. In some embodiments, an add-on response may provide more information relating to the line of inquiry or may generate additional question for the chat bot user or customer to gauge further interest. In other embodiments, length of chat bot conversation, a particular intent and slot combination, or a response that may be limited with information may trigger a chat bot question to a user or customer about a desire to speak to a sales representative or to other human assistance. In yet other embodiments, length of chat bot conversation, identification of particular intent and slot combinations, or a given generated response to a chat bot query may also generate a follow on question or an add on response asking if a user or customer would like additional detailed information. Then a script of a series of question to a chat bot user or customer may seek contact information or ask for a form to be filled out. Such information may be validated and follow up questions may seek corrections. Then, as before, the customized chat bot integration software system may continue to monitor the chat bot user interface for additional user input or queries at 770. If none are received, the process may then end. In an embodiment, a thank you or other salutation and indication that the chat has ended may be generated at the chat bot user interface. If additional chat bot user input is received, the customized chat bot integration software system may loop back to 710 and proceed as before with the next round of chat conversation.

The blocks of the flow diagrams of FIGS. 4 and 7, as well as the custom connector code set and a run-time engine capable of executing that code set for a customized chat bot integration software system depicted in the block diagrams of FIGS. 5 and 6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a custom chat bot integration software system comprising:
    a processor generating a customized chat bot integration system for interfacing with a plurality of data formats for fulfillment of customized chat bot responses to chat bot queries via integration of a natural language processing platform within an end-to-end chat bot specific business integration process, wherein the customized chat bot integration system for an end to end chat bot specific business integration process is generated from a customized visual model of the end to end chat bot specific business integration process with a plurality of visual modeling elements selected from a menu of visual modeling elements corresponding to code sets for interfacing with the plurality of data formats for data retrieval and storage;
    the chat bot interface player for receiving a chat bot query;
    the processor accessing the natural language processing platform for recognition of an intent and a slot in a received chat bot query;
    the processor conducting fulfillment routing by determining whether a received intent and slot combination requires a dynamic response by accessing a fulfillment and response database for recognized keywords in the received intent and slot combination via the generated end to end chat bot specific business integration process;
    the processor fulfilling the chat bot query via interfacing with a chat bot interface player accessing internal or external data sources with the generated end to end chat bot specific business integration process to retrieve data from the plurality of data formats from multiple databases of differing formats to compose the dynamic chat bot query response to fulfill slots requiring a dynamic response to compose a chat bot query response; and
    the chat bot interface player presenting the chat bot query response.

2. The information handling system of claim 1, wherein the processor fulfills the chat box query by utilizing a natural language processing platform response when the received chat box query is classified for a simpler query response to compose the chat bot query response.

3. The information handling system of claim 1, wherein the end to end chat bot specific integration process determines the response received from the natural language processing platform based on previous chat bot queries and responses recorded in a fulfillment and response database established with the customized chat bot integration system.

4. The information handling system of claim 1 further comprising:
    the modeling elements corresponding to code sets including:
        a chat bot template process flow for integration with a natural language processor platform code set and one or more connector code sets comprising data required for electronic communication in accordance with a specific application programming interface; and
        an external data partner code set comprising data required for electronic communication with a specific external data partner's system.

5. The information handling system of claim 1 further comprising:
    a fulfillment and response database for storing chat bot conversation log data for status and fulfillment success of chat bot query responses, chat bot query responses, and association of intent and slot combinations with chat bot query responses or data locations.

6. The information handling system of claim 5 further comprising:
    the fulfillment and response database utilized with an artificial intelligence system to categorize successful or missed chat bot query responses for machine learning association with intent and slot combinations.

7. The information handling system of claim 5 further comprising:
    the customized chat bot integration system detects a reply miss in the fulfillment and response database and the processor generating a connector import wizard user-interface allowing an administrator to provide response customization inputs to be associated with the received intent and slot combination.

8. A method of generating a customized chat bot integration software system comprising:
    importing, via a processor, a chat bot template process flow into an end to end chat bot integration process-modeling user interface each including visual interface modeling elements corresponding to code sets, wherein the end to end chat bot integration process-modeling user interface may include visual, drag-and-drop icons representing specific units of work for modelling and generating a specific end to end chat bot integration process;
    modifying and customizing the visual interface modeling elements in a customized chatbot integration software system via an import wizard user-interface allowing selection of operation objects from the plurality of operation objects for each visual interface modeling element to generate the specific end to end chat bot integration process to interface with a plurality of data formats from multiple databases of differing formats;

creating a fulfillment and response database via a set up wizard for storing chat bot conversation log data for status and fulfillment success of chat bot query responses, storing chat bot query responses, and storing association of intent and slot combinations with chat bot query responses or data locations;

linking, via electronic communication, a published bot for a natural language processing platform to the customized chat bot integration software system to enable access of the published bot via the generated end to end chat bot specific business integration process;

determining, via a processor, an intent and a slot in chat bot queries received via a chat bot interface player linked via the customized chat bot integration software system;

generating a dynamic chat bot query response with a natural language processing platform intent and slot recognition and fulfillment of a slot query with data retrieval from the plurality of data formats from the multiple databases of differing formats via the generated specific end to end chat bot integration process interfacing with the plurality of data formats.

9. The method of claim 8 further comprising:
detecting an intent and slot combination and triggering a flow override to generate a follow-on chat bot conversation response comprising a follow-up question or an add-on statement via the chat bot interface player to a user.

10. The method of claim 9, wherein the follow-on chat bot conversation response relates to a lead for pursuing further interest from a chat bot user.

11. The method of claim 9, wherein the follow-on chat bot conversation response relates to an inquiry to a chat bot user of whether a sales rep is desired.

12. The method of claim 9, wherein the follow-on chat bot conversation response relates to an inquiry to a chat bot user of whether additional information related to the chat bot query is desired.

13. The method of claim 8, wherein modifying and customizing the visual interface modeling elements via the import wizard user-interface includes drop down menus and customized data entry fields for customization of the visual interface modeling elements to operate in accordance with the native interface rules of data sources in an enterprise in generating the specific end to end chat bot integration process with the plurality of data formats.

14. The method of claim 8, wherein the chat bot conversation history includes storing customized chat bot operation data relating to chat bot conversation log data for status and fulfillment success of chat bot query responses and storing chat bot query responses.

15. An information handling system for generating a customized end to end chat bot integration software system comprising:
a display displaying visual interface modeling elements corresponding to code sets in an end to end chat bot business integration process-modeling user interface and displaying visual, drag-and-drop icons representing specific units of work for a specific end to end chat bot business integration process to integrate access to plurality of data formats from the multiple databases of differing formats to generate a specific end to end chat bot business integration process;
a processor importing a chat bot template process flow for interfacing with the plurality of data formats, a chat bot interface player, and a service provider natural language processing platform for use with the generated specific end to end chat bot business integration process;
the processor modifying and customizing the visual interface modeling elements in the customized chatbot integration software system via an import wizard user-interface allowing selection of operation objects of the visual interface modeling elements from the plurality of operation objects for customization and generation of the specific end to end chat bot business integration process;
a memory storing a fulfillment and response database via a set up wizard for storing chat bot conversation history and storing association of intent and slot combinations with chat bot query responses or data locations;
a secured, electronic communication link to a published bot from the natural language processing platform; and
the processor receiving chat bot queries and generating chat bot responses via a chat bot interface player,
wherein the customized chat bot integration software system determines an intent and a slot from chat bot queries received via the chat bot interface player and provides a dynamic, chat bot query response by slot fulfillment with data retrieval from the plurality of data formats from the multiple databases of differing formats via the generated specific end to end chat bot business integration process interfacing with the plurality of data formats in the customized chat bot integration software system to generate a first chat bot response.

16. The information handling system of claim 15, wherein the fulfillment and response database stores chat bot query fulfillment history, chat bot query status logs, and responses to previous chat bot queries to be associated with intent and slot combinations via machine learning categorization for use with generating chat bot query responses by the customized chat bot integration software system.

17. The information handling system of claim 16, wherein the fulfillment and response database stores association of intent and slot combinations with chat bot query responses or data locations.

18. The information handling system of claim 15, wherein an action router visual interface modeling element detects an intent and slot combination to trigger a flow override to generate a follow-on chat bot conversation response comprising a follow-up question or an add-on statement to a received chat bot query via the chat bot interface player to a user.

19. The information handling system of claim 18, further comprising:
the processor executing the customized chat bot integration software system to determine when a received chat box query is classified as a simple chat box query; and
the processor to generate a simple, natural language processing platform response as a second chat box response.

20. The information handling system of claim 15, wherein modifying and customizing the visual interface modeling elements in a customized chatbot integration software system includes customizing the graphical appearance of a chat bot interface player embedded in an enterprise website via the import wizard user-interface for the chat bot interface player.

* * * * *